US012784210B2

(12) United States Patent
Nishimura

(10) Patent No.: US 12,784,210 B2
(45) Date of Patent: Nov. 3, 2026

(54) IMAGE PROCESSING APPARATUS, STORAGE MEDIUM AND DISPLAY STEREOSCOPIC IMAGE PRODUCING METHOD

(71) Applicant: J. MORITA MFG. CORP., Kyoto (JP)

(72) Inventor: Yuu Nishimura, Kyoto (JP)

(73) Assignee: J. MORITA MFG. CORP., Kyoto (JP)

( * ) Notice: Subject to any disclaimer, the term of this patent is extended or adjusted under 35 U.S.C. 154(b) by 245 days.

(21) Appl. No.: 18/813,780

(22) Filed: Aug. 23, 2024

(65) Prior Publication Data

US 2025/0078265 A1 Mar. 6, 2025

(30) Foreign Application Priority Data

Aug. 30, 2023 (JP) ................................ 2023-139768

(51) Int. Cl.
*G06T 7/00* (2017.01)
*H04N 13/261* (2018.01)

(52) U.S. Cl.
CPC ......... *G06T 7/0012* (2013.01); *H04N 13/261* (2018.05); *G06T 2207/10081* (2013.01); (Continued)

(58) Field of Classification Search
CPC ......... A61C 7/002; A61C 7/20; A61C 9/0053; A61C 1/084; A61C 19/04; A61C 5/90; A61C 8/0006; A61C 8/009; A61C 13/08; G05B 19/4097; G05B 2219/35012; G05B 2219/37205; G01N 33/56955; (Continued)

(56) References Cited

U.S. PATENT DOCUMENTS

2006/0279568 A1 12/2006 Matsumoto
2008/0232540 A1 9/2008 Yoshimura et al.
(Continued)

FOREIGN PATENT DOCUMENTS

EP 3 618 005 A1 3/2020
EP 3 806 034 A1 4/2021
(Continued)

OTHER PUBLICATIONS

Extended European Search Report issued Jan. 20, 2025 in European Patent Application No. 24196762.9, 9 pages.

*Primary Examiner* — Alex Kok S Liew
(74) *Attorney, Agent, or Firm* — Oblon, McClelland, Maier & Neustadt, L.L.P.

(57) ABSTRACT

An image processing apparatus that performs processing for image data of a maxillofacial region obtained by X-ray CT imaging, and includes a memory that stores image data including an alveolar bone region, and an image processor that generates a display stereoscopic image based on the image data. The image processor executes processing for setting a continuous section curved along the alveolar bone region in the alveolar bone region, and processing for generating, as the display stereoscopic image, an image in which a transparency degree of a first region located in a region on one side with the continuous section in the alveolar bone region as a boundary is displayed to be larger than a transparency degree of a second region located in a region on the other side with the continuous section in the alveolar bone region as a boundary.

19 Claims, 28 Drawing Sheets

(52) U.S. Cl.
CPC ............... *G06T 2207/30008* (2013.01); *G06T 2207/30036* (2013.01)

(58) Field of Classification Search
CPC ........... G06T 15/08; G06T 2207/10081; G06T 2207/30008; G06T 2207/30036; G06T 2210/41; G06T 2215/06; G06T 7/0012
See application file for complete search history.

(56) References Cited

U.S. PATENT DOCUMENTS

| | | | | |
|---|---|---|---|---|
| 2018/0028065 | A1* | 2/2018 | Elbaz | H04N 13/221 |
| 2018/0353266 | A1* | 12/2018 | Song | A61C 9/0053 |
| 2019/0231492 | A1 | 8/2019 | Sabina et al. | |
| 2021/0104048 | A1* | 4/2021 | Nishimura | G06T 7/11 |
| 2022/0117708 | A1* | 4/2022 | Cofar | A61C 9/0053 |

FOREIGN PATENT DOCUMENTS

| | | | |
|---|---|---|---|
| EP | 3 841 980 | A1 | 6/2021 |
| JP | H08-215192 | A | 8/1996 |
| JP | 2006-305203 | A | 11/2006 |
| JP | 2008-259822 | A | 10/2008 |

* cited by examiner

IMAGE PROCESSING APPARATUS, STORAGE MEDIUM AND DISPLAY STEREOSCOPIC IMAGE PRODUCING METHOD

BACKGROUND

Field

The present disclosure relates to a technique for processing image data of a maxillofacial region obtained by X-ray CT imaging.

Description of the Background Art

Japanese Patent Application Laid-Open No. 2006-305203 discloses displaying a volume rendering image based on reconstruction data of a three-dimensional region obtained by X-ray CT imaging. In generating the volume rendering image for display, it is disclosed that the volume rendering image including any one of tomographic images of an X-tomographic plane, a Y-tomographic plane, and a Z-tomographic plane of an XYZ-coordinate system that pass through a point of interest in a three-dimensional region and are mutually orthogonal is generated.

A technique related to the display of a CT image is also disclosed in Japanese Patent Application Laid-Open No. 2008-259822 and Japanese Patent Application Laid-Open No. 8-215192.

However, in the volume rendering image of the maxillofacial region, it is difficult to three-dimensionally grasp the internal structure of the volume rendering image, for example, a state of an alveolar bone and a state of a tooth. A jawbone is curved, and a plurality of teeth are curved in an arch shape. For this reason, even when the volume rendering image includes any one of the tomographic images of the X-tomographic plane, the Y-tomographic plane, and the Z-tomographic plane, the region suitable for observation is limited.

SUMMARY

An object of the present disclosure is to provide a display stereoscopic image suitable for a wider range of observation based on the image data of the maxillofacial region obtained by the X-ray CT imaging.

An image processing apparatus that processes image data of a maxillofacial region obtained by X-ray CT imaging, the image processing apparatus includes: a memory that stores the image data including an alveolar bone region; and an image processor that generates a display stereoscopic image based on the image data, in which the image processor executes: processing for setting a continuous section curved along the alveolar bone region in the alveolar bone region; and processing, as the display stereoscopic image, for generating an image in which a transparency degree of a first region located in a region on one side with the continuous section in the alveolar bone region as a boundary is displayed to be larger than a transparency degree of a second region located in a region on the other side with the continuous section in the alveolar bone region as a boundary.

An image processing program for causing a computer that performs processing for image data of a maxillofacial region obtained by X-ray CT imaging to execute: processing for setting a continuous section curved along an alveolar bone region in the alveolar bone region included in the image data; and processing for generating a display stereoscopic image in which a transparency degree of a first region located in a region on one side with the continuous section in the alveolar bone region as a boundary is displayed to be larger than a transparency degree of a second region located in a region on the other side with the continuous section in the alveolar bone region as a boundary.

According to the present disclosure, it is possible to provide the display stereoscopic image suitable for the wider range of the observation based on the image data of the maxillofacial region obtained by the X-ray CT imaging.

These and other objects, features, aspects and advantages of the present disclosure will become more apparent from the following detailed description of the present disclosure when taken in conjunction with the accompanying drawings.

DESCRIPTION OF THE EMBODIMENTS

One Embodiment

Hereinafter, an image processing apparatus and an image processing program according to one embodiment will be described.

<Overall Configuration of X-Ray Imaging Apparatus>

Figure 1:
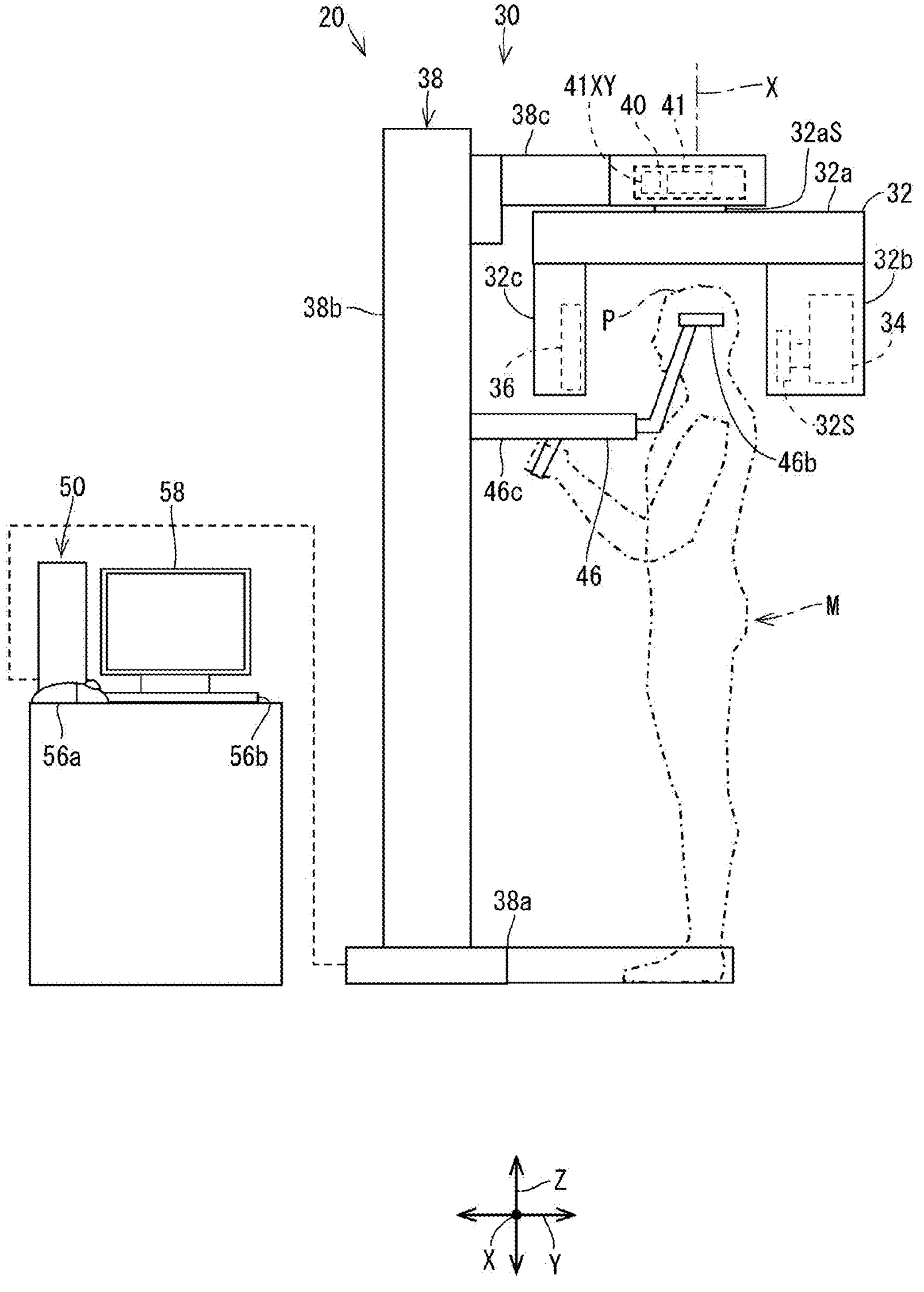
FIG. 1 is a schematic front view illustrating an X-ray CT imaging apparatus according to one embodiment.

An overall configuration of an X-ray imaging apparatus, including the image processing apparatus, will be described. FIG. 1 is a schematic front view illustrating an X-ray imaging apparatus 20.

Directions are defined for convenience of description. An XYZ-orthogonal coordinate system is an orthogonal coordinate system defined in a three-dimensional space in which the X-ray imaging apparatus 20 is installed. The body axis direction of an imaging subject M when held by an X-ray imaging execution apparatus 30 to be described later is a Z-axis direction, and a vertical direction along a gravity direction is the Z-axis direction in a case where the X-ray imaging execution apparatus 10 is an upright type as in the one embodiment. A direction orthogonal to the Z-axis direction is set to a Y-axis direction, and a direction orthogonal to the Z-axis direction and the Y-axis direction is set to an X-axis direction. In the one embodiment, a front-back direction of a head P of the imaging subject M held by a subject support 46 to be described later is defined as the Y-axis direction, and a left-right direction of the head is defined as the X-axis direction. Sometimes, a two-dimensional direction or plane including a plurality of directions, for example, the X-axis direction, the Y-axis direction, and a combined direction thereof may be represented as "X-Y". For example, an "X-Y plane" is a plane orthogonal to the Z-axis direction.

The X-ray imaging apparatus 20 includes the X-ray imaging execution apparatus 30 and an image processing apparatus 50.

The X-ray imaging execution apparatus 30 is configured to be able to execute X-ray computed tomography (CT) imaging. The X-ray imaging execution apparatus 30 executes the X-ray CT imaging to collect X-ray imaging data (also referred to as projection data). The collected X-ray imaging data is output to the image processing apparatus 50. The image processing apparatus 50 generates X-ray CT image data based on the X-ray imaging data. The X-ray CT image data is three-dimensional volume data. In addition, the image processing apparatus 50 generates a display stereoscopic image suitable for observation or diagnosis based on the X-ray CT image data. A display stereoscopic image means a stereoscopic image for display or a stereoscopic image to be displayed.

The X-ray imaging execution apparatus 30 may be configured to be able to execute at least one of simple transmission X-ray imaging, panoramic X-ray, and cephalographic imaging in addition to the X-ray CT imaging. In this case, the image processing apparatus 50 may be configured to be able to generate at least one of simple transmission image data, panoramic X-ray image data, and cephalogram image data based on the X-ray imaging data.

In the present application, in the case where there is a description of "at least one" for a plurality of matters connected by a conjunction such as "and", "at least one" does not relate to individual matters but relates to all of the plurality of matters connected by "and". Consequently, for example, an expression of "at least one A and B" means "in the case of A", "in the case of B" or "in the case of both A and B".

More specifically, the X-ray imaging execution apparatus 30 includes an X-ray generator 34, an X-ray detector 36, a turning support 32, a drive mechanism 40, and the subject support 46. The X-ray generator 34 and the X-ray detector 36 are supported by the turning support 32. The turning support 32, the drive mechanism 40, and the subject support 46 are supported at positions above a floor by a support frame 38.

More specifically, the support frame 38 includes a base 38*a*, a post 38*b*, and an upper frame 38*c*. The base 38*a* extends horizontally on the floor. The post 38*b* is supported by the base 38*a* in a vertical posture extending upward from the floor. A base end portion of the upper frame 38*c* is supported in a cantilever state by the post 38*b*. The upper frame 38*c* extends outward from the post 38*b* along the horizontal direction. The upper frame 38*c* may be movable up and down with respect to the post 38*b* by an electric motor or the like or manually.

The turning support 32 includes a body 32*a* formed in an elongated shape, a generator support 32*b*, and a detector support 32*c*. A collimator 32*s* that collimates generated X-ray is provided in front of an X-ray irradiation port of the X-ray generator 34 in the generator support 32*b*, and for example, the X-ray is collimated to form an X-ray cone beam for the X-ray CT imaging or to form an X-ray narrow beam for panoramic X-ray imaging.

The turning support shaft 32*a*S protrudes upward from an intermediate portion in a longitudinal direction of the body 32*a*. An upper end portion of the turning support shaft 32*a*S is rotatably supported by a bearing portion of the drive mechanism 40 provided in the upper frame 38*c*. The turning support 32 can turn around a center axis X of the turning support shaft 32*a*S while being suspended by the upper frame 38*c* through the drive mechanism 40.

In synchronization with the turning of the turning support 32, the turning support shaft 32*a*S may be moved along the X-Y plane, for example, may be turned. The movement of the turning support shaft 32*a*S may be performed by an electric motor that applies X-Y moving force different from an electric motor that applies turning force to the turning support 32. In the case where the turning support shaft 32*a*S is turned in synchronization with the turning of the turning support 32 around the turning support shaft 32*a*S, a turning diameter of the generator support 32*b* or the detector support 32*c* can be larger or smaller than the turning diameter determined by the distance of the generator support 32*b* or the detector support 32*c* with respect to the turning support shaft 32*a*S.

In the following description, regardless of the presence or absence of the turning movement of the turning support shaft 32*a*S, a curvature center of a turning locus on which the generator support 32*b* or the detector support 32*c* actually moves is a turning center X.

The generator support 32*b* is formed in a case shape capable of accommodating the X-ray generator 34. The detector support 32*c* is supported in a case shape capable of accommodating the X-ray detector 36. The generator support 32*b* and the detector support 32*c* are supported by the body 32*a*. The turning center X is set to pass between the generator support 32*b* and the detector support 32*c*. A gap in which the head P can be disposed is set between the generator support 32*b* and the detector support 32*c*. For example, the generator support 32*b* is supported in a hanging manner at one end portion of the body 32*a*, and the detector support 32*c* is supported in a hanging manner at the other end portion of the body 32*a*. The generator support 32*b* and the detector support 32*c* can turn around the head P while the head P is disposed between the generator support 32*b* and the detector support 32*c*.

The X-ray generator 34 is an X-ray source that generates the X-ray, and for example, includes an X-ray tube. The X-ray generator 34 is accommodated in the generator support 32*b* in a posture in which the irradiation direction of the X-ray is directed to the side of the detector support 32*c*.

The X-ray detector 36 is a sensor that detects the X-ray, and for example, includes a flat panel detector (FPD) or an X-ray image intensifier. The X-ray detector 36 is accommodated in the detector support 32*c* in a posture in which the detection surface of the X-ray detector 36 faces the side of the detector support 32*c*.

When disposed between the generator support 32*b* and the detector support 32*c*, the head P is disposed between the X-ray generator 34 and the X-ray detector 36. In this state, the X-ray generator 34 irradiates the head P with the X-ray. The X-ray detector 36 receives and detects the X-ray transmitted through the head P.

The drive mechanism 40 drives to turn the turning support 32. For example, the drive mechanism 40 includes an electric motor 41 incorporated in the upper frame 38*c*. Rotational driving force of the electric motor 41 is transmitted to the turning support shaft 32*a*S of the turning support 32. The rotational driving force of the electric motor 41 may be directly transmitted to the turning support shaft 32*a*S, or transmitted to the turning support shaft 32*a*S through a transmission mechanism such as a motor or a pulley.

An electric motor 41XY that moves and drives the bearing portion that receives the turning support shaft 32*a*S may be provided in the drive mechanism 40. The bearing portion is guided in the X-Y direction by a bearing portion movement guide, and moves along the X-Y plane by receiving driving force of the electric motor 41XY. For example, the turning support shaft 32*a*S can be turned by turning the bearing portion.

As described above, the turning support 32 can turn while the head P is disposed between the generator support 32*b* and the detector support 32*c*. During the turning, the X-ray generator 34 irradiates the head P with the X-ray, and the X-ray detector 36 can receive and detect the X-ray transmitted through the head P. Thus, the X-ray detector 36 can detect the transmitted X-rays from a plurality of directions with respect to the head P.

Figure 2:
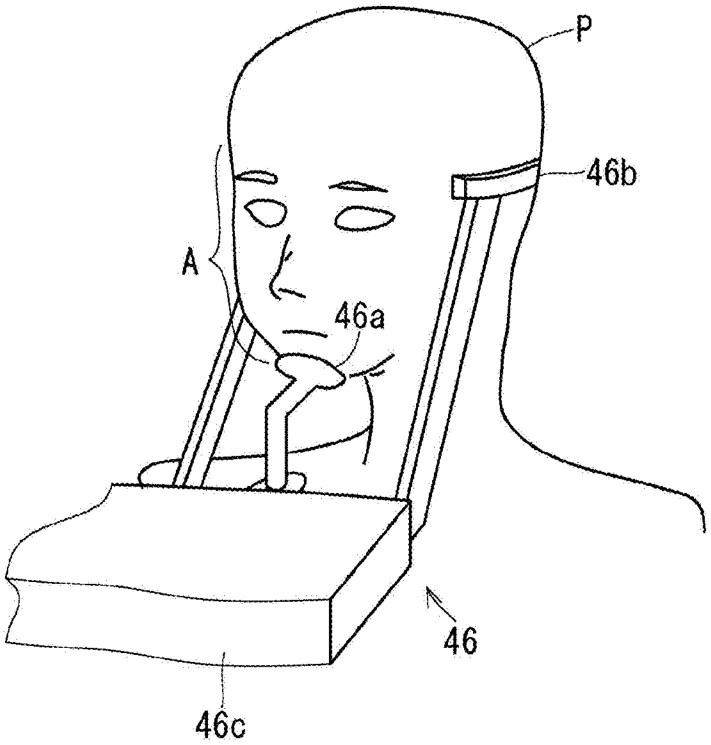
FIG. 2 is an explanatory drawing illustrating a state in which a subject support supports a head.
Figure 3:
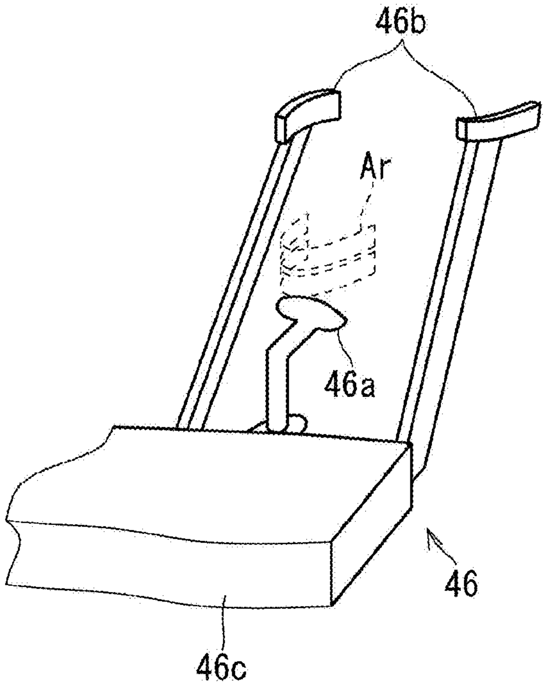
FIG. 3 is an explanatory drawing illustrating a positional relationship between the subject support and a dental arch region.

The subject support 46 is a holder that holds the imaging subject, namely, the head P of the imaging subject M. FIG. 2 is an explanatory drawing illustrating a state in which the subject support 46 supports the head P. FIG. 3 is an explanatory drawing illustrating a positional relationship between subject support 46 and a dental arch region Ar.

As illustrated in FIGS. 1 to 3, for example, the subject support 46 includes a chin rest 46*a*, a head holder 46*b*, and a subject support frame 46*c*.

The subject support frame 46*c* is formed in an elongated shape. A base end portion of the subject support frame 46*c* is supported in a cantilever manner by the post 38*b*. The subject support frame 46*c* extends from the post 38*b* along the horizontal direction. The subject support frame 46*c* extends from a position lower than the generator support 32*b* and the detector support 32*c* toward an inner peripheral side of the turning path of the generator support 32*b* and the detector support 32*c*.

The chin rest 46*a* and the head holder 46*b* are supported at a tip of the subject support frame 46*c*. The chin rest 46*a* and the head holder 46*b* are supported to face between the X-ray generator 34 and the X-ray detector 36 that are supported by the turning support 32. The head P supported by the subject support 46 is held at a fixed position between the X-ray generator 34 and the X-ray detector 36 during the turning of the X-ray generator 34 and the X-ray detector 36.

The chin rest 46*a* fixes a maxillofacial region A at a fixed position by supporting the tip of a lower jaw of the head P. A maxillofacial region is a jaw including upper and lower teeth, and the maxillofacial region A is a region including the maxillofacial region. The maxillofacial region A includes a dental arch region Ar and an alveolar bone region Alv (see FIG. 7). The dental arch refers to a curve in which a plurality of teeth are arranged in an arch shape from a front tooth toward a molar, and the dental arch region Ar is a region including a plurality of teeth arranged along such a dental arch. In addition, the alveolar refers to a hollow into which a root of the tooth fits, the alveolar bone is a bone that forms a plurality of alveoli into which a plurality of teeth arranged along the dental arch fit, and the alveolar bone region Alv is a region including such the alveolar bone. Only a region where the alveolar exists may be considered as the alveolar bone region Alv, or a region from the region where the alveolar exists to a temporomandibular region may be considered as the alveolar bone region Alv. The region where the alveolar exists and a part of the region continuous with the temporomandibular region may be considered as the alveolar bone region Alv. A part of the region where the alveolar exists may be considered as the alveolar bone region Alv. The alveolar bone region in a display target tissue region to be described later may be considered as the alveolar bone region Alv.

In the present application, the maxillofacial region that is a subject of the X-ray CT imaging and the maxillofacial region that is a display target may not necessarily be the entire region. For example, only one of a lower jaw and an upper jaw, only one of the left region and the right region, only the right region of the upper jaw or the lower jaw, only the left region of the upper jaw or the lower jaw, only the front teeth close region, and only the upper jaw portion or the lower jaw portion in the front teeth close region can be locally imaged.

Although the image data of the X-ray CT imaging of the wide region is obtained, only a part of the image data can be set as an image processing target. For example, while the image data of the X-ray CT imaging of the entire maxillofacial region is obtained, only the local region of interest can be cut out as the image processing target.

In addition to or instead of the chin rest 46*a*, the subject support 46 may include a bite piece that is bitten by upper and lower front teeth.

The head holder 46*b* positions the head P with respect to the X-axis direction by holding the head P from both sides of the head holder 46*b*. In the subject support 46, the chin rest 46*a* or the head holder 46*b* may be omitted.

The subject support 46 may be movable up and down with respect to the post 38*b* by an electric motor or the like or manually.

The positions of the turning support 32 and the subject support 46 are adjusted with reference to the post 38*b*. For this reason, the positions and turning trajectories of the X-ray generator 34 and the X-ray detector 36 with respect to the head P supported by the subject support 46 can be known information. In the volume data generated based on the X-ray imaging data, the positions of the dental arch region Ar and the alveolar bone region Alv can also be known information.

The turning support 32 is turned while the head P is supported by the subject support 46, and the X-ray generator 34 and the X-ray detector 36 can be turned around the head P. Thus, the X-ray CT imaging of the head P is performed by the X-ray imaging execution apparatus 30.

The image processing apparatus 50 is a computer that performs processing for the image data of the maxillofacial region obtained by the X-ray CT imaging by the X-ray imaging execution apparatus 30. The projection data obtained by the X-ray CT imaging of the maxillofacial region is an example of the image data of the maxillofacial region obtained by the X-ray CT imaging. In the one embodiment, the image processing apparatus 50 is communicably connected to the X-ray imaging execution apparatus 30, and controls operation of the X-ray imaging execution apparatus 30. In the one embodiment, the image processing apparatus 50 generates volume data as the image data including the maxillofacial region based on detection data of the X-ray detector 36 obtained by the X-ray CT imaging.

At least one of the processing for controlling the operation of the X-ray imaging execution apparatus 30 and the processing for generating the volume data may be executed by a computer different from the image processing apparatus 50.

<Electric Configuration>

Figure 4:
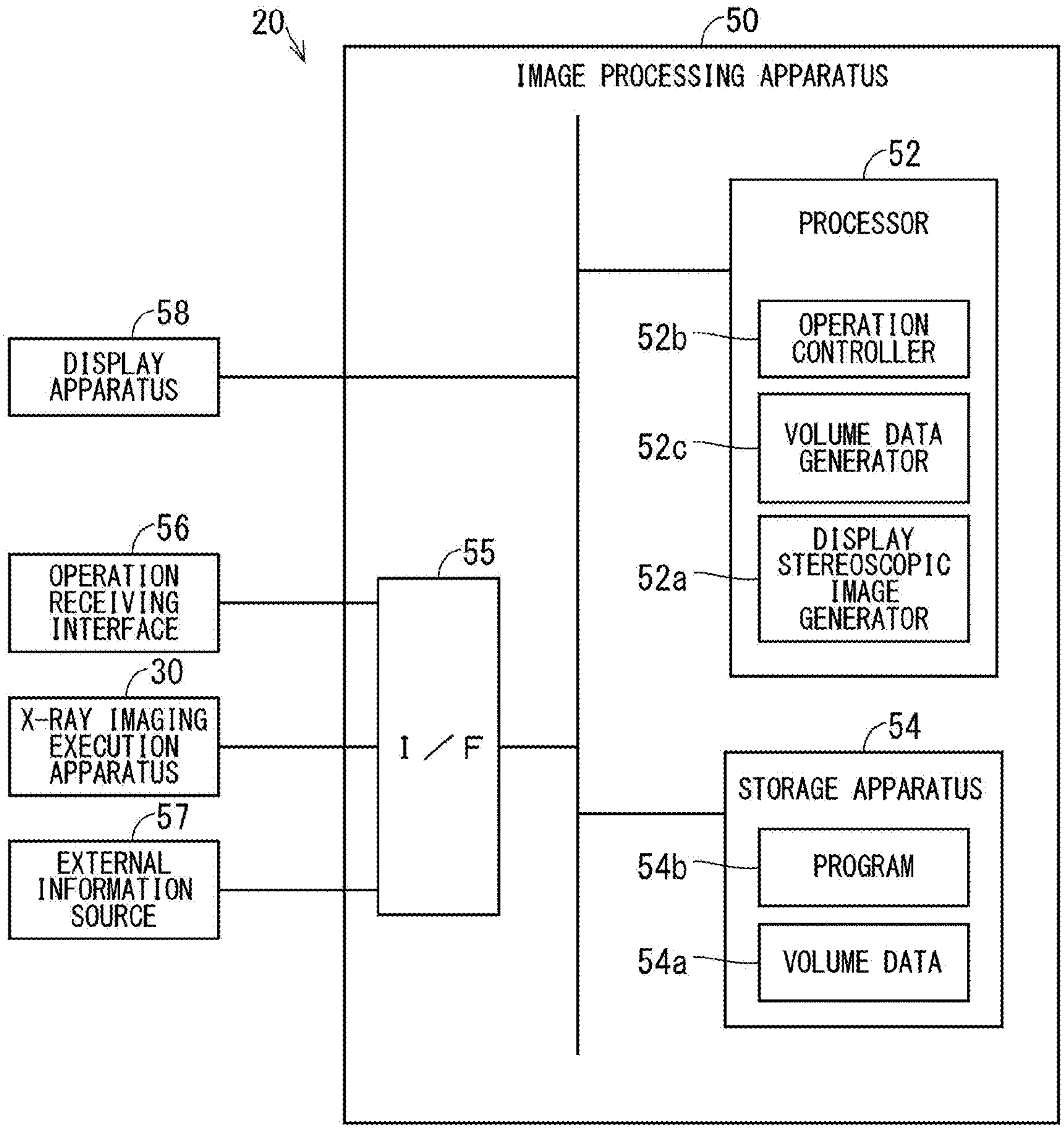
FIG. 4 is a block diagram illustrating an example of an electric configuration of an image processing apparatus.

FIG. 4 is a block diagram illustrating an example of an electric configuration of the image processing apparatus 50.

The image processing apparatus 50 includes at least one processor 52 and a storage apparatus 54 that is a memory.

The storage apparatus 54 is a non-transitory storage medium and, for example, is a flash memory or a hard disk apparatus. The storage apparatus 54 stores volume data 54*a* of the maxillofacial region A as the image data including the alveolar bone region Alv.

The storage apparatus 54 stores a program 54*b* in which a processing procedure for generating the display stereoscopic image based on the volume data 54*a* is described. The display stereoscopic image is an image generated by performing rendering processing on the volume data 54*a* to be suitable for display on a display apparatus 58. For example, the display stereoscopic image may be an image in which how the volume data 54*a* is viewed from an arbitrary viewpoint is two-dimensionally expressed. In other words, the display stereoscopic image may be a two-dimensionally displayed stereoscopic image. The viewpoint may be previously set at a predetermined position in the coordinate system of the volume data, or may be set at an arbitrary position by the user.

A feature of the stereoscopic image is as follows. The image when an object is stereoscopically viewed is considered.

Figure 5A:
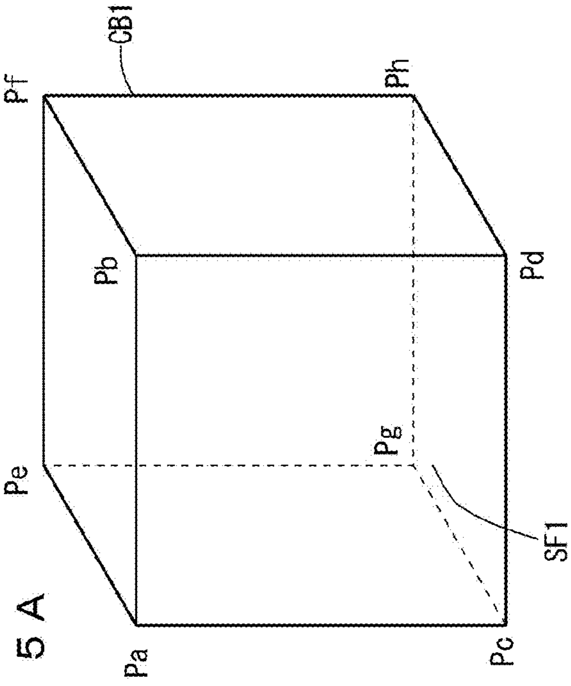
FIGS. 5A, 5B and 5C are explanatory drawings illustrating a feature when stereoscopic images are stereoscopically viewed.
Figure 5B:
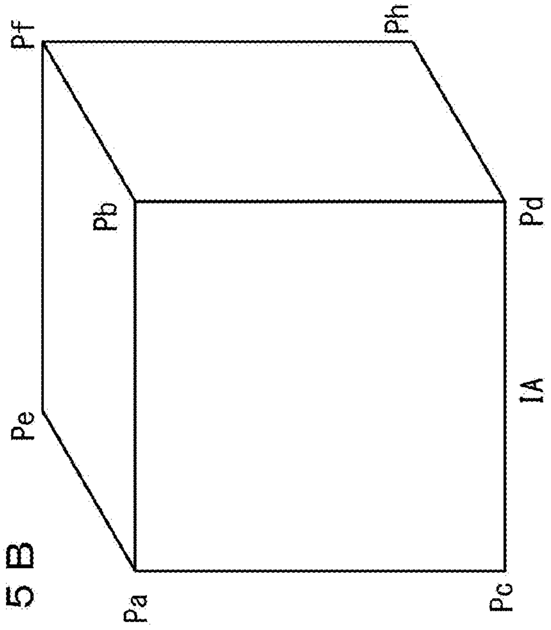
Figure 5C:
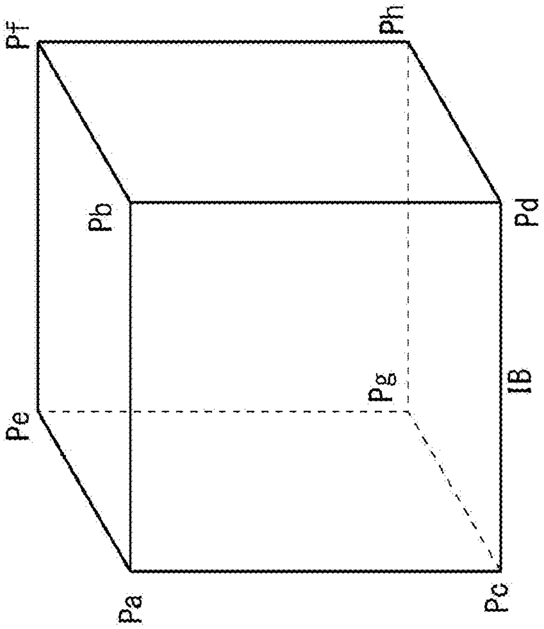

FIG. 5A illustrates a simple cube CB1. A cube CB1 has eight apexes Pa, Pb, Pc, Pd, Pe, Pf, Pg, Ph. Now, it is assumed that a proximity on a visual line is close to the observation viewpoint viewed from the observation viewpoint, and that a distance on the visual line is far from the observation viewpoint. The apex Pg has a relationship that a surface SF1 including at least the apexes Pa, Pb, Pc, Pd exists closer to the side of the proximity on the visual line than the apex Pg. In other words, the apex Pg is on the farther side of the distance on the visual line than the surface SF1. In the case where a transparency degree of the cube CB1 is 0%, the apex Pg is not visible as in a stereoscopic image IA of FIG. 5B. In the case where the transparency degree of the cube CB1 is greater than 0%, as in a stereoscopic image IB of FIG. 5C, the apex Pg is blocked by a portion closer to the proximity on the visual line than the apex Pg, and lacks observational clarity. As described above, the stereoscopic image is an image having a three-dimensional shape, and may be considered as an image in which, on the path of the visual line from the observation viewpoint, the image on the side of the distance on the visual line of the three-dimensional shape is lower in the observational clarity than the image on the proximity on the visual line.

The stereoscopic image may be an image having a strong stereoscopic effect using human left-right parallax that can be observed with a VR headset worn on the head.

The program 54*b* may include an imaging program that receives various instructions related to the X-ray imaging and controls the drive mechanism 40, the X-ray generator 34, the X-ray detector 36, and the like according to the instructions to control the X-ray CT imaging operation.

The program 54*b* may include a program that generates the volume data 54*a* based on the detection data from the X-ray detector 36 after the X-ray CT imaging.

The processor 52 is circuitry, and includes a central processing unit (CPU) and the like. The processor 52 executes the program 54*b* to implement various processing functions of the processor 52.

The processor 52 has an image processing function as a functional block implemented by executing the program 54*b*, for example, as a display stereoscopic image generator 52*a*. That is, the processor 52 is an example of an image processor C52. In the case where there is a main circuit including a CPU and a sub-circuit dependent on the main circuit, the main circuit and the sub-circuit may be considered as the processor 52. The display stereoscopic image generator 52*a* is a processing block that generates the display stereoscopic image based on the volume data 54*a* as the image data. The image processing function will be described more specifically with reference to the flowchart of FIG. 6.

In the one embodiment, the processor 52 may have processing functions as an operation controller 52*b* and a volume data generator 52*c*. The operation controller 52*b* is a processing block that controls the X-ray CT imaging operation of the X-ray imaging execution apparatus 30, and the volume data generator 52*c* is a processing block that generates the volume data 54*a* from the X-ray CT imaging data.

A part or all of the functions implemented in the processor 52 may be implemented in hardware by a dedicated logic circuit or the like. A part or all of the functions implemented in the processor 52 may be integrated and processed by one processor, or processed in a distributed manner by a plurality of processors.

The image processing apparatus 50 may be connected to the X-ray imaging execution apparatus 30, an operation receiving interface 56, and an external information source 57 through an interface circuit 55.

The operation receiving interface 56 is a man-machine interface that receives a support operation by the user, and may be configured by at least one of a switch, a keyboard, a touch panel, and a mouse. In FIG. 1, a mouse 56*a* and a keyboard 56*b* are illustrated as an example of the operation receiving interface 56.

The external information source 57 is an information source provided not inside the image processing apparatus 50 but outside the image processing apparatus 50. For example, the external information source 57 may be an external server installed outside the image processing apparatus 50 and connected through a communication line. The volume data 54*a* may be stored in the external information source 57. The external information source 57 may store information about the imaging subject M associated with the volume data 54*a*. For example, the information about the imaging subject M is a name, a gender, or an identification code.

The image processing apparatus 50 may be connected to the display apparatus 58. The display apparatus 58 is a display apparatus that displays the display stereoscopic image, and for example, is a liquid crystal display apparatus or an organic electroluminescent (EL) display apparatus. The image processing apparatus 50 and the display apparatus 58 may be integrated.

Processing Example in Image Processing Apparatus

Figure 6:
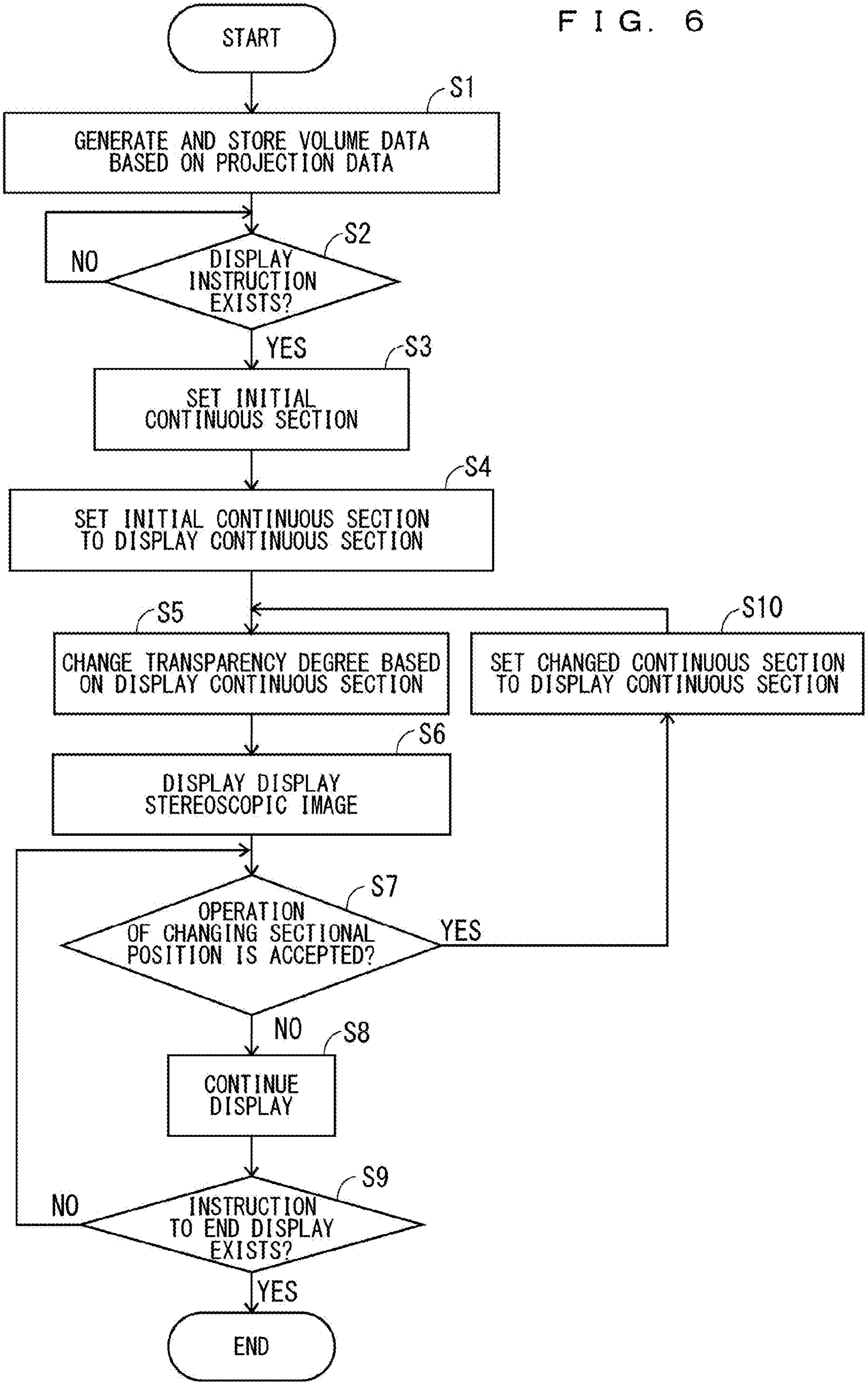
FIG. 6 is a flowchart illustrating a processing example of the image processing apparatus.

FIG. 6 is a flowchart illustrating an example of volume data generation processing and an example of display stereoscopic image generation processing by the image processing apparatus 50. Specific processing is performed by the image processor C52.

That is, the X-ray CT imaging is performed while the X-ray imaging execution apparatus 30 turns the X-ray generator 34 and the X-ray generator 34 around the head P. Thus, projection data corresponding to a distribution of an X-ray absorption coefficient of the head P is obtained for each of the X-rays projected from the plurality of directions with respect to the head P.

In step S1, the image processing apparatus 50 operates a three-dimensional distribution of an X-ray absorbance of the head P based on the projection data from the plurality of directions, and generates the volume data 54*a*. For example, the volume data 54*a* includes a plurality of voxels three-dimensionally arranged according to the position of the head P, and each of the plurality of voxels has a voxel value indicating the X-ray absorbance. The voxel value may be understood to be a CT value based on the X-ray absorption coefficient.

In the one embodiment, the X-ray CT imaging is performed by the X-ray imaging execution apparatus 30 to include the maxillofacial region A of the head P. For this reason, the volume data 54*a* includes the dental arch region Ar and the alveolar bone region Alv.

The generated volume data 54*a* is stored in the storage apparatus 54.

Subsequently, in step S2, it is determined whether a display instruction exists. For example, when the display instruction is input by the user through the operation receiving interface 56, it is determined that the display instruction exists. The processing in step S2 is repeated until it is determined that the display instruction exists, and the processing proceeds to step S3 when it is determined that the display instruction exists.

In step S3, an initial continuous section is set. The initial continuous section is a section initially set as a continuous section curved along the alveolar bone region Alv. An example of the continuous section curved along the alveolar bone region Alv will be described later.

When the initial continuous section is set in step S3, the processing proceeds to next step S4. In step S4, the initial continuous section is set as a display continuous section used for the generation processing for the display stereoscopic image based on the volume data 54*a*. Thus, the display continuous section curved along the alveolar bone region Alv is set in the alveolar bone region Alv.

In steps S3, S4, the processing for setting the continuous section curved along the alveolar bone region Alv in the alveolar bone region Alv is executed.

In next step S5, the processing for changing the transparency degree of the volume data 54*a* based on the display continuous section is executed. More specifically, in the alveolar bone region Alv of the volume data 54*a*, the transparency degree of a first region located in a region on one side with the display continuous section as a boundary is made larger than the transparency degree of a second region located in a region on the other side with the display continuous section as the boundary. The processing for increasing the transparency degree is referred to as transparency promotion processing and the processing for increasing the transparency degree of the first region to be higher than the transparency degree of the second region is referred to as first region transparency promotion processing. For example, a first transparency degree is set to the first region, and a second transparency degree is set to the second region. The transparency degree set to the first region may be the transparency degree set to each of the plurality of voxels included in the first region. The transparency degree set to the second region may be the transparency degree set to each of the plurality of voxels included in the second region.

The transparency degree is a measure representing transparency. The higher the transparency degree, the closer the transparency, and the lower the transparency degree, the closer opacity. For example, the transparency degree may be a value indicating a percentage between the transparency and the opacity. In this case, the transparency degree of 100% is transparent and the transparency degree of 0% is opaque. When the transparency degree is between 100% and 0%, the region is semitransparent, and the region becomes more transparent as the value is larger.

The transparency degree of 100% may be referred to as completely transparent, and a completely transparent image may be referred to as a completely transparent image. The transparency degree of 0% may be referred to as completely opaque, and a completely opaque image may be referred to as a completely opaque image. The transparency degree between 100% and 0% may be referred to as incompletely transparent, and an incompletely transparent image may be referred to as an incompletely transparent image.

Subsequently, in step S6, the display stereoscopic image that is subjected to volume rendering based on the volume data 54*a* to which the transparency degree is set is automatically generated, and the display stereoscopic image is displayed on the display apparatus 58. The volume rendering is processing for generating the two-dimensional image in which the inside can be seen through according to the transparency degree of each element of the volume data. For example, in the case where the volume data includes the plurality of voxels arranged three-dimensionally, the elements of each voxel on a plurality of visual lines (projection lines) from the viewpoint position (camera position) are integrated according to the transparency degree, thereby generating the display stereoscopic image. The display image may be an image obtained by surface rendering based on the volume data 54*a*.

In steps S5 and S6, processing for generating the display stereoscopic image in which the transparency degree of the first region having the display continuous section as the boundary is displayed to be larger than the transparency degree of the second region is executed. In steps S5 and S6, the display stereoscopic image in which the transparency degree of the first region is larger than the transparency degree of the second region may be generated as a display result. For this reason, it is not essential to generate intermediate data in which the transparency degree is set in association with each voxel of the volume data 54*a*.

For example, in step S5, the transparency degree may be set to at least one of the voxels of the first region and the voxels of the second region in the volume data 54*a*. In this case, in step S6, the rendering processing may be performed based on the volume data 54*a* to which the transparency degree is set, and the display stereoscopic image may be generated. For example, in step S5, it is assumed that the transparency degree of the first region is set to 100% and the transparency degree of the second region is set to 0%. In this case, in step S6, in the case where the display stereoscopic image viewed from the first region is generated, the display stereoscopic image in which the first region is made invisible while the second region is visualized is generated. For example, in step S5, the transparency degree of the first region is set to 50%, and the transparency degree of the second region is set to 0%. In this case, in the case where the display stereoscopic image viewed from the first region is generated in step S6, the display stereoscopic image in which the second region can be observed through the translucent first region is generated.

Furthermore, for example, assuming that each voxel value of the volume data 54*a* indicates display density, setting the transparency degree to 100% may be considered as setting the voxel value to 0. Consequently, for example, in step S5, the voxel value of the first region may be set to 0. In this case, in step S6, in the case where the display stereoscopic image viewed from the first region is generated, the display stereoscopic image in which the first region is made invisible while the second region is visualized is generated. Setting the voxel value of the first region to 0 may be considered as deleting the image of the first region to generate and display the display stereoscopic image.

Subsequently, in step S7, it is determined whether the operation of changing the position of the display continuous section is accepted. The user operates the operation receiving interface 56 to change the position of the display continuous section. For example, the enlargement scale of the display continuous section and the position change operation to the front and rear or the left and right may be received by the operation of the mouse 56*a*. More specifically, the enlargement scale of the display continuous section may be received by the operation of the mouse 56*a* on the wheel, and the operation of changing the position of the display continuous section to the front and rear or the left and right may be received by a combination of any key operation on the keyboard and the wheel operation of the mouse 56*a*. In addition, the operation of changing the position of the display continuous section may be received by a keyboard operation, a touch operation using a touch screen, or the like. When it is determined in step S7 that the change operation is received, the processing proceeds to step S10.

In step S10, the changed continuous section is set as the display continuous section. Thereafter, the processing proceeds to step S5, and the above processing is repeated. Thus, the display stereoscopic image corresponding to the changed continuous section is automatically generated.

When it is determined in step S7 that there is no operation of changing the position of the display continuous section, the processing proceeds to step S8.

In step S8, the display of the display stereoscopic image in step S6 is continued.

Subsequently, in step S9, it is determined whether an instruction to end the display exists. The instruction to end the display is made by the user operating the operation receiving interface 56. For example, the instruction to end the display is input by a pointer operation of the mouse 56*a*, the keyboard operation, or the like. When it is determined that there is no instruction to end the display, the processing returns to step S7, and the subsequent pieces of processing are repeated. When it is determined that there is the instruction to end the display, the processing for the display ends.

<Continuous Section Curved Along Alveolar Bone Region>

Figure 7:
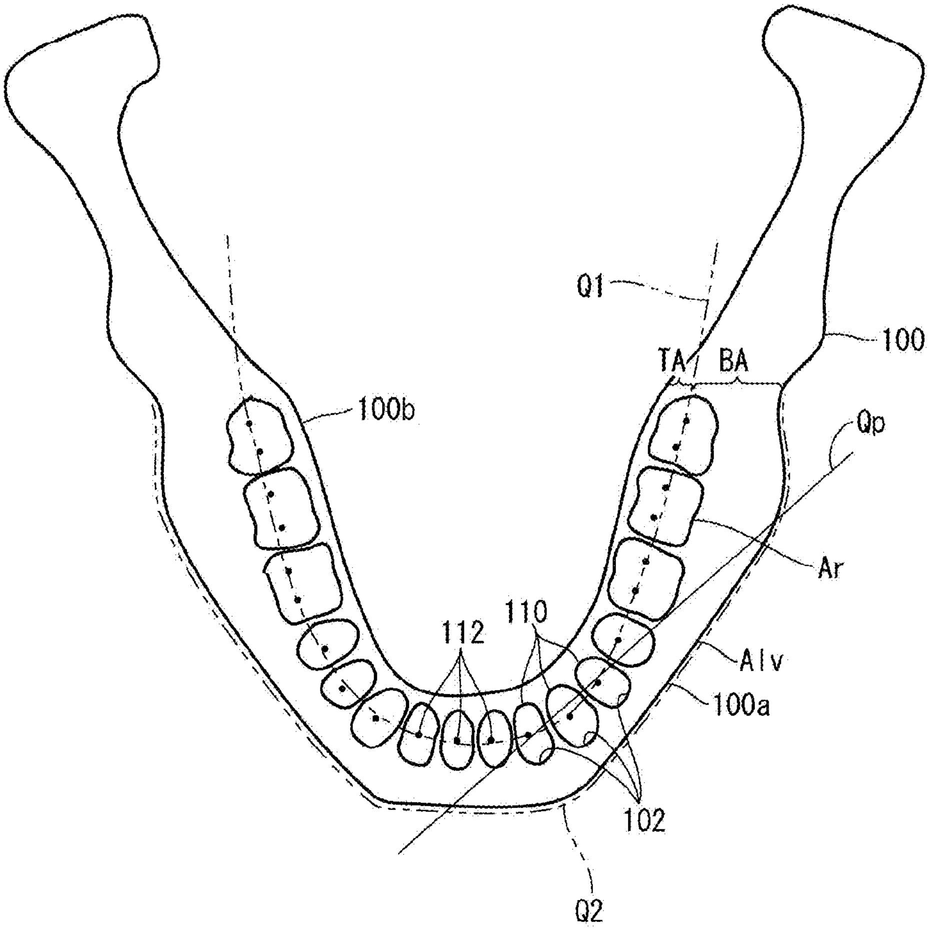
FIG. 7 is an explanatory drawing illustrating a setting example of a continuous section with respect to an alveolar bone region.

FIG. 7 is an explanatory view illustrating a setting example of the continuous section with respect to the alveolar bone region. FIG. 7 is a sectional view taken along the XY plane, and illustrates the alveolar bone region Alv and the dental arch region Ar of the lower jaw.

The continuous sections Q1, Q2 curved along the alveolar bone region Alv are continuous sections curved in a U-shape along the direction in which a plurality of alveoli 102 are arranged in the alveolar bone 100. Because a root of a tooth (tooth region) 110 is buried in each of the plurality of alveoli 102, the continuous section Q1 curved along the alveolar bone region Alv may be understood to have the same shape as the continuous section curved in the U-shape along the direction in which the teeth 110 are arranged in the dentition supported by the alveolar bone 100.

For example, the continuous section Q1 curved along the alveolar bone region Alv may be set based on a tooth root 112. In this case, the continuous section Q1 has the same width in the height direction, but may be set as the continuous section. The tooth root 112 of the tooth 110 may be considered to coincide with the deepest portion of the alveoli 102. Consequently, the continuous section Q1 curved along the plurality of tooth roots 112 may be considered to be the continuous section Q1 curved along the deepest portion of the plurality of alveoli 102.

Sometimes one tooth has a plurality of tooth roots. In this case, the position of a center of a root apex of each tooth root may be regarded as the position of the tooth root 112. The center may be a center of gravity of a figure formed by the plurality of root apexes viewed from the Z-direction.

In this case, the continuous section curved along the alveolar bone region Alv may be a section in which the same shape is continuous in the height direction.

Furthermore, for example, the continuous section Q2 curved along the alveolar bone region Alv may be set with reference to an outer surface 100*a* or an inner surface 100*b* of the alveolar bone 100. In FIG. 7, the continuous section Q2 is set along the outer surface 100*a*. The continuous section may be set inside the outer surface 100*a* or between the outer surface 100*a* and the inner surface 100*b*. In this case, in the height range where the alveolar bone 100 exists, the continuous section Q2 can be determined for each coordinate in each height direction (Z-axis direction). Consequently, in this case, the continuous section Q2 may be set as a section in which the shape continuously changes in the height direction.

The continuous sections Q1, Q2 are along the alveolar bone region Alv. For this reason, the continuous sections Q1, Q2 are easily set to continuously cross the plurality of teeth 110. In particular, the continuous section Q1 is easily set to continuously cross near the roots of the plurality of teeth 110. When the alveolar bone 100 and the tooth 110 appearing in the continuous sections Q1, Q2 are observed, it is easy to simultaneously and entirely observe the plurality of teeth 110.

As illustrated in FIG. 7, when a section Qp is a plane, the number of teeth 110 that can be traversed by the section Qp is smaller than the number of teeth 110 that can be traversed by the continuous sections Q1, Q2. Furthermore, the position where the section Qp can cross each tooth 110 greatly differs in a buccolingual direction. For this reason, even when the alveolar bone 100 and the tooth 110 appearing in the section Qp are observed, it is difficult to simultaneously and entirely observe the plurality of teeth 110.

Figure 8:
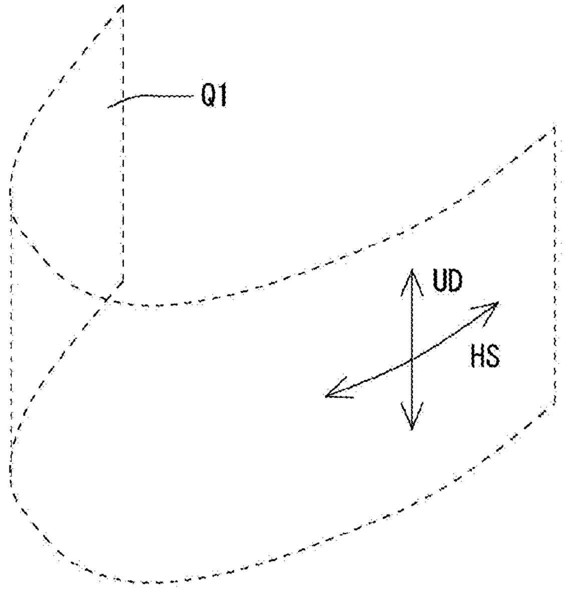
FIG. 8 is a view illustrating an example of the continuous section.

As illustrated in FIG. 8, the continuous section may be set to include a surface having a spread in a vertical direction of the head of the subject and a bending direction along a horseshoe shape of the dental arch. FIG. 8 illustrates the continuous section Q1 in perspective view. The continuous section Q1 is constituted by a surface having a spread of a vertical direction UD of the head and a bending direction HS intersecting the direction UD and bending along the horseshoe shape of the dental arch. Thus, the continuous section is set to divide the alveolar bone region into a buccal region BA and a lingual region TA. One of the buccal region BA and the lingual region TA may be the first region R1, and the other may be the second region R2.

As above, the continuous section Q1 may be set so as to divide the alveolar bone region Alv into a buccal region BA and a lingual region TA. One of the buccal region BA and the lingual region TA may be the first region R1, and the other may be the second region R2.

The initial continuous section may be an initially set section regardless of the distribution of the voxel values in the coordinate system in the volume data 54*a*. That is, the X-ray CT imaging is performed while the head P is supported by the subject support 46. For this reason, the support position of the head P in the volume data 54*a* is a known coordinate. In the coordinate system in the volume data 54*a*, the continuous section set assuming the dental arch region Ar or the alveolar bone region Alv included in the head P of the standard skeleton may be set as the initial continuous section.

The initial continuous section may be a continuous section obtained based on the image data of the maxillofacial region obtained by the X-ray CT imaging. For example, the continuous section may be obtained based on the volume data 54*a*. A processing example of obtaining the continuous section curved along the alveolar bone region Alv based on the volume data 54*a* will be described later.

Setting Example of Transparency Degree

Figure 9:
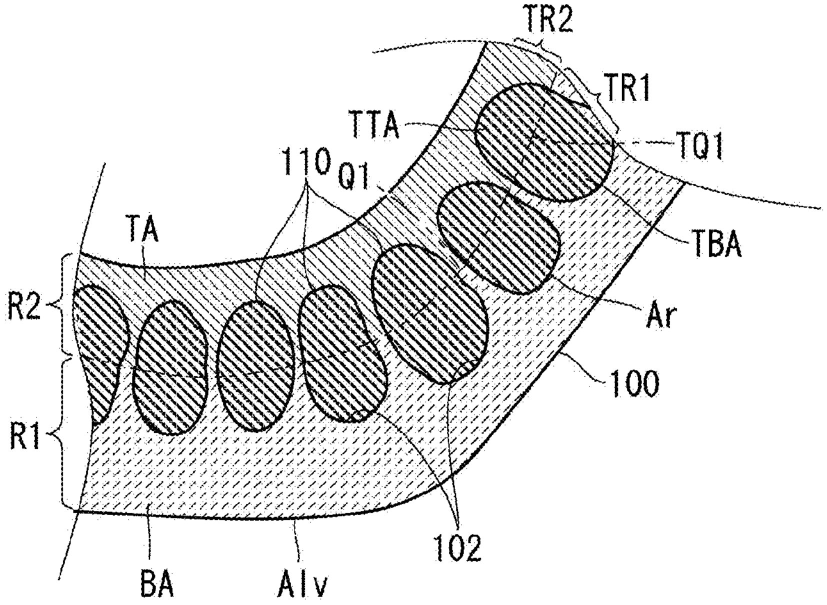
FIG. 9 is an explanatory drawing illustrating a setting example of a transparency degree with respect to the alveolar bone region.

FIG. 9 is an explanatory view illustrating a setting example of the transparency degree with respect to the alveolar bone region. FIG. 9 is a partially enlarged sectional view of FIG. 7.

As illustrated in FIG. 9, the display continuous section is set in the alveolar bone region Alv. The display continuous section is the continuous section Q1 curved along the tooth root 112 described above.

In the alveolar bone region Alv, the first region R1 exists in a region on one side with the display continuous section Q1 as the boundary, and the second region R2 exists in a region on the other side. For example, the first region R1 is a buccal side of the display continuous section Q1. The buccal side of the display continuous section Q1 is the outer peripheral side of the display continuous section Q1. The second region R2 is a lingual side of the display continuous section Q1. The lingual side of the display continuous section Q1 is the inner peripheral side of the display continuous section Q1.

Conversely, the first region R1 may be on the lingual side of the display continuous section Q1, and the second region R2 may be on the buccal side of the display continuous section Q1. When the volume data 54*a* is rendered, the transparency degree of the side on which the viewpoint is located is high. This is because when the transparency degree on the viewpoint side is high, it is easy to observe a region having low transparency degree through a region having high transparency degree.

For example, in the case where it is desired to observe the alveolar bone region Alv and the dental arch region Ar from the buccal side, the first region R1 may be set on the buccal side of the display continuous section Q1, and the second region R2 may be set on the lingual side of the display continuous section Q1.

Steps S5 and S6 may include processing for specifying the regions of the plurality of teeth 110 and generating, as the display stereoscopic image, the display stereoscopic image in which the transparency degree of the region of the teeth 110 is displayed to be smaller than the transparency degree of the first region R1.

For example, in step S5, the plurality of teeth 110 may be specified, and the transparency degree of the region of the teeth 110 may be set to be smaller than the transparency degree of the first region R1.

For example, the region of the plurality of teeth 110 may be specified by performing edge extraction processing and pattern matching processing based on the voxel values in the volume data 54*a*. The image processing may be performed by machine learning, or may be performed as general segmentation processing by, for example, a watershed algorithm, a region expansion method, a graph-cut method, a level-set method, a snake method, or the like.

For example, the region of the plurality of teeth 110 may be performed by a machine-learned learned model. For example, the learned model includes a multilayer neural network and is stored in the storage apparatus 54. The processor 52 reads the program and the parameter that are described in the learned model and executes identification processing, so that the region of the tooth 110 in the volume data 54*a* is specified. For example, the learned model is generated by a machine learning apparatus configured by a computer. The machine learning apparatus generates the learned model that specifies the region of the tooth 110 in the volume data using a plurality of volume data in which the region of the tooth 110 is distinguished as learning data. Processing is performed in which the tooth region and the alveolar bone region are three-dimensional data independent from each other in the image processing. Accordingly, for example, the region of the plurality of teeth 110 may be segmented as described above, and the alveolar bone region Alv may also be segmented. By performing such processing, for example, processing in which the section of only one of the tooth region and the alveolar bone region is displayed can be performed. The region of the plurality of teeth 110 may be a tooth region. The tooth region may be a region in which teeth are grouped together and identified as a single region, or it may be a region in which a plurality of individually identified tooth are grouped together and treated as a single region. So the region of tooth 110 may be the tooth region 110.

Then, in step S6, the volume data 54*a* is subjected to rendering processing based on the transparency degree set in the region of the teeth 110, so that the display stereoscopic image in which the transparency degree of the region of the teeth 110 is set to be smaller than the transparency degree of the first region R1 is generated and displayed. Because the transparency degree of the region of the tooth 110 is small, the tooth 110 is displayed more clearly than the first region R1 of the alveolar bone region Alv.

In the case where the transparency degree of the tooth 110 is 0% while the transparency degree of the first region R1 is set to 100%, the voxel value in the region of the tooth 110 may be maintained at the initial value, and the voxel value of the first region R1 may be set to 0. When the volume data 54*a* after the setting is subjected to the rendering processing, the display stereoscopic image in which the transparency degree of the region of the tooth 110 appears to be smaller than the transparency degree of the first region R1 is generated and displayed.

As an example of setting the transparency degree, for example, the transparency degree of the first region R1 may be 100%, and the transparency degree of the second region R2 and the region of the tooth 110 may be 0%. In this case, the first region R1 is made invisible, and it is easy to observe the second region R2 and the teeth 110.

Figure 10:
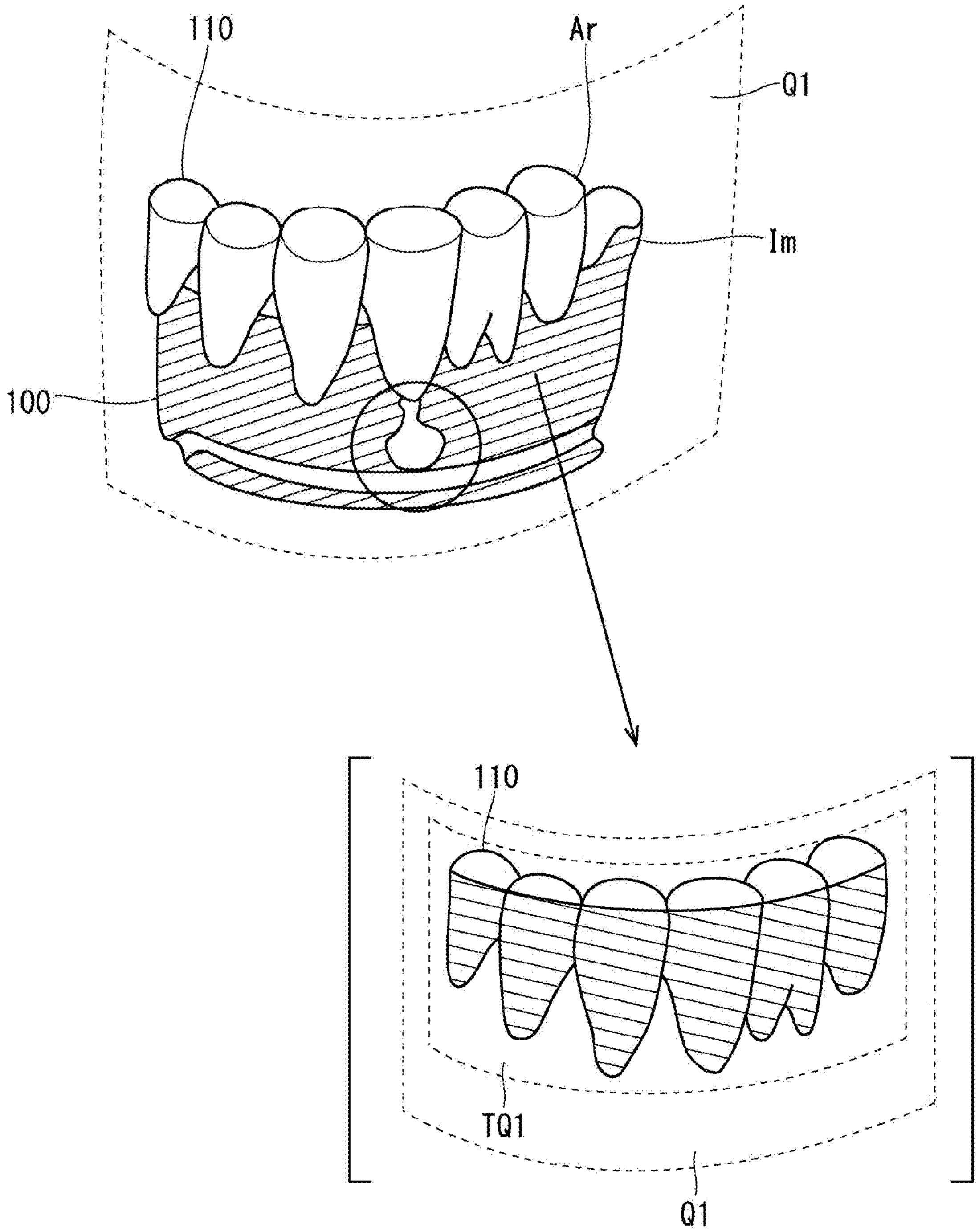
FIG. 10 is a view illustrating a display example of a display stereoscopic image.
Figure 11:
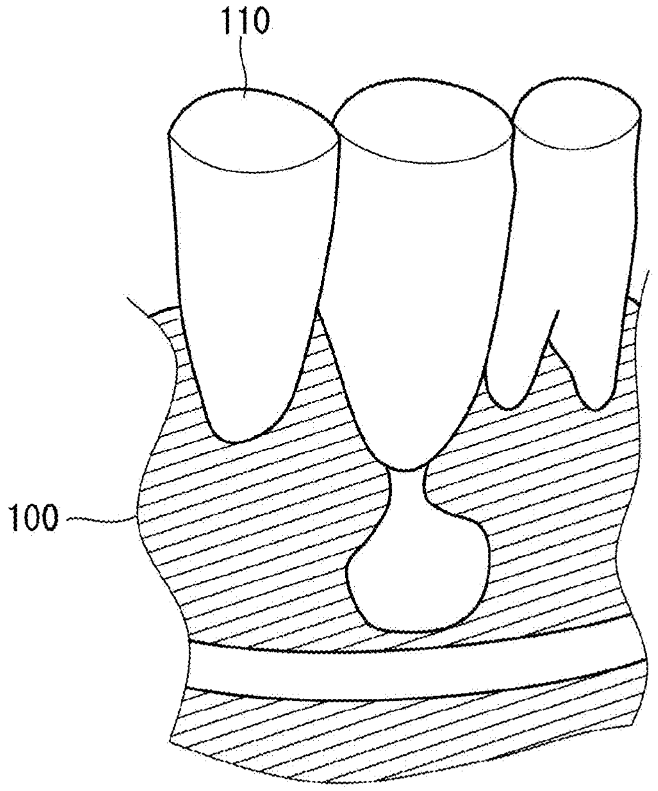
FIG. 11 is an enlarged view of FIG. 10.

A display example of a display stereoscopic image Im in this case is illustrated in FIGS. 10 and 11. FIG. 11 is an enlarged view of FIG. 10. As illustrated in these figures, the section of the alveolar bone region Alv cut along the continuous section Q1 is displayed. In this section, the plurality of teeth 110 are arranged along the continuous section Q1. The illustration is only an example of the left side of the mandible for simplicity. However, such processing may be performed when the local imaging is performed at the stage of the X-ray CT imaging described above, or such processing may be performed as a result of setting only a part of the image data of the X-ray CT imaging as the image processing target while obtaining the image data of the wide region. By displaying the section of the alveolar bone region Alv cut along the continuous section Q1, the state in which the plurality of teeth 110 are buried in the alveolar bone 100 is easily grasped as a whole and collectively. The section of the teeth 110 may not be displayed as illustrated such that the observer can concentrate on observing the state of the alveolar bone 100. In addition, the shapes of a mandibular canal and a cyst along the alveolar bone region Alv (see the encircled portion) can be easily grasped. FIG. 11 is an enlarged view of the cyst. In this manner, an image enlarged around the region of interest may be generated.

The image of the sectional display may be referred to as a sectional display image. The target region of the sectional display may be referred to as a sectional display region. The non-sectional display as in the illustrated image of the tooth 110 may be referred to as non-sectional display, and the image of the non-sectional display may be referred to as a non-sectional display image. The target region of the non-sectional display may be referred to as a non-sectional display region.

In FIGS. 10 and 11, the non-sectional display of the tooth region 110 (dental arch region Ar) is performed, but as indicated in square brackets in FIG. 10, the sectional display of the tooth region may be displayed. In this case, the section may be cut along the continuous section Q1. In this case, similarly to the alveolar bone region, one region may be considered to be the first region TR1 of the tooth region and the other region may be considered to be the second region TR2 of the tooth region with the continuous section Q1 as the boundary. The sectional display and the non-sectional display may be switched for the tooth region. For example, in FIGS. 10 and 11, the sectional display and the non-sectional display may be switched for the tooth region. The switching display may be performed by operation reception or may be automatically displayed for a predetermined period and switched.

The continuous section Q1 may be set so as to divide the tooth region 110 (dental arch region Ar) into a tooth buccal region TBA and a tooth lingual region TTA. The setting of transparency degree of the first region TR1 of the tooth region and the second region TR2 of the tooth region is the same as the setting of transparency degree of the first region R1 and the second region R2.

Concerning one of the buccal region and the lingual region set as the first region and the other set as the second region, it can be applied to the setting of the alveolar bone region Alv and the tooth region 110. In other words, when the buccal region BA of the alveolar bone region Alv is set as the first region R1 and the lingual region TA of the alveolar bone region Alv is set as the second region R2, the tooth buccal region TBA of the tooth region 110 is set as the first region TR1 of the tooth region and the tooth lingual region TTA of the tooth region 110 is set as the second region TR2 of the tooth region. When the buccal region BA of the alveolar bone region Alv is set as the second region R2 and the lingual region TA of the alveolar bone region Alv is set as the first region R1, the tooth buccal region TBA of the tooth region 110 is set as the second region TR2 of the tooth region and the tooth lingual region TTA of the tooth region 110 is set as the first region TR1 of the tooth region.

The common continuous section Q1 can be set to both of the tooth region 110 and the alveolar bone region Alv, but a specific continuous section can be set to the tooth region 110 and the alveolar bone region Alv respectively as described below.

The processor C52 can also set a dental arch continuous section TQ1 in the tooth region 110, as a continuous section curved along the tooth region 110 (dental arch region Ar). The dental arch continuous section TQ1 may be set so as to divide the tooth region 110 into a tooth buccal region TBA and a tooth lingual region TTA. The dental arch continuous section TQ1 can be set so as to have continuity against the continuous section Q1 or can be set to have no continuity against the continuous section Q1. The dental arch continuous section TQ1 may overlap with the continuous section Q1 at the same position in buccolingual direction or the dental arch continuous section TQ1 and the continuous section Q1 may be set at different position in the buccolingual direction.

The setting of transparency degree of the first region of the tooth region TR1 and the second region of the tooth region TR2 may be the same as the setting of transparency degree of the first region R1 and the second region R2. Concerning one of the buccal region and the lingual region set as the first region and the other set as the second region, it can be applied to the setting of the alveolar bone region Alv and the tooth region 110. The same is applied in the case that the tooth region 110 (dental arch region Ar) is divided by the continuous section Q1.

Movement of the continuous section Q1 and the dental arch continuous section TQ1 can be independent to each other or dependent to each other. Therefore, the next operations are possible. For example, only one of the continuous section and the dental arch continuous section TQ1 can be moved when the other remains without movement, the continuous section and the dental arch continuous section TQ1 can be moved in the opposite direction. Both can be moved in the same direction in synchronization. In the case that both move in the same direction, both can move in a status that both overlap at the same position in the buccolingual direction.

The sectional display and the non-sectional display may be switched for the tooth region 110.

The completely opaque sectional display may be referred to as a completely opaque sectional display, and the image of the completely opaque sectional display may be referred to as a completely opaque sectional display image. The incompletely transparent sectional display may be referred to as incompletely transparent sectional display, and the image of the incompletely transparent sectional display may be referred to as an incompletely transparent sectional display image.

The sectional display of the second region may be performed in a completely opaque manner or in an incompletely transparent manner. For example, the sectional display of the second region can be implemented by making the entire second region completely opaque or incompletely transparent. The target tissue region of the image processing displayed on the display apparatus to indicate the sectional display region may be referred to as the display target tissue region. For example, the region indicated by the display stereoscopic image Im including both the tooth region including the tooth 110 and the alveolar bone region Alv including the alveolar bone 100 in FIG. 10 is an example of the display target tissue region. Because the second region is a region cut along the continuous section Q1 and has lower transparency degree than the first region, the section of the second region is displayed as long as the surface of the continuous section Q1 is displayed in the visible manner by making the second region completely opaque or incompletely transparent.

The first region may be displayed in the completely transparent manner or the incompletely transparent manner. For example, the sectional display of the second region can be implemented by making the entire first region completely transparent or incompletely transparent and making the transparency degree larger than that of the second region.

The completely opaque non-sectional display may be referred to as a completely opaque non-sectional display, and the image of the completely opaque non-sectional display may be referred to as a completely opaque non-sectional display image. The incompletely transparent non-sectional display may be referred to as incompletely transparent non-sectional display, and the image of the incompletely transparent non-sectional display may be referred to as an incompletely transparent non-sectional display image.

The non-sectional display of the tooth region may be made completely opaque or incompletely transparent. For example, the non-sectional display of the tooth region can be implemented by making the entire tooth region completely opaque or incompletely transparent.

However, in the case where the section of the tooth region is displayed, the tooth region may be completely opaque or incompletely transparent. In this case, for example, the sectional display of the tooth region can be implemented by making the entire second region of the tooth region completely opaque or incompletely transparent.

In particular, when a global illumination processing for performing the rendering by calculating not only direct light from a light source but also indirect light due to reflection or the like is executed during the rendering processing for the volume data 54*a*, unevenness and front-back feeling of the second region R2 and the teeth 110 appearing in the continuous section Q1 can be easily grasped.

Figure 12:
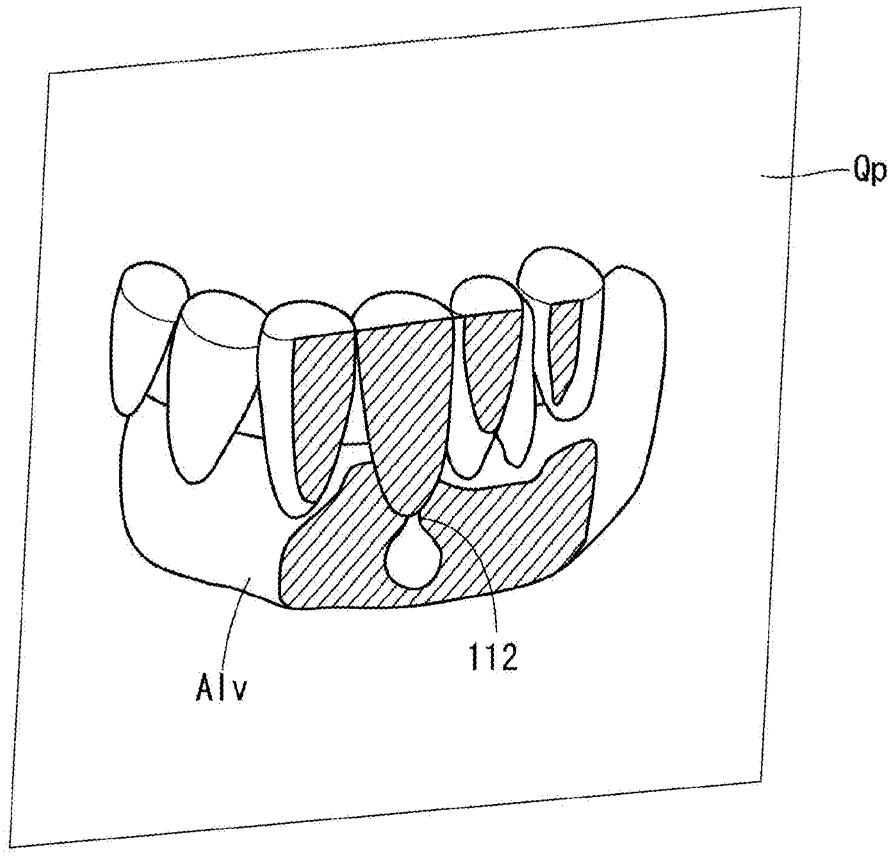
FIG. 12 is a view illustrating a display example according to a comparative example.

FIG. 12 is a view illustrating a display example according to a comparative example. FIG. 12 illustrates the display example in the case where the alveolar bone region Alv is cut along the section Qp that is a plane. In this case, the number of teeth 110 appearing in the section Qp is smaller than the number of teeth 110 appearing in the case where the teeth 110 are cut in the continuous section along the dental arch region Ar. In addition, the positions of the plurality of teeth 110 are different in the buccolingual direction, and the tooth root 112 of the other tooth 110 is displaced when the section Qp is aligned with the position of the tooth root 112 of one tooth 110. For this reason, it is difficult to collectively observe how the plurality of teeth 110 are buried in the alveolar bone 100.

On the other hand, as in the one embodiment, in the case of being cut in the continuous section Q1 along the dental arch region Ar, a large number of teeth 110 appear in the continuous section Q1, so that it is easy to observe the large number of teeth 110 as a whole and collectively. In addition, because similar positions of the plurality of teeth 110 appear in the continuous section Q1, for example, it is easy to collectively observe how the plurality of teeth 110 are buried in the alveolar bone 100.

In addition, because the transparency degree of the region of the tooth 110 is smaller than the transparency degree of the first region R1, the shape of the portion of the tooth 110 buried in the first region R1 is easily observed. Thus, how the tooth 110 is buried in the second region R2 of the alveolar bone 100 is easily observed. In the continuous section Q1 along the dental arch region Ar, a large number of teeth 110 are displayed in a convex state, so that how to bury the large number of teeth 110 can be easily observed.

First Example of Setting Processing for Continuous Section

In step S3, the continuous section curved along the alveolar bone region Alv may be obtained based on the volume data 54*a*. A processing example that obtains the continuous section will be described.

As a first setting processing example, the positions of the plurality of tooth roots 112 in the dental arch may be specified, and the continuous section Q1 may be set based on the positions of the plurality of tooth roots.

Figure 13:
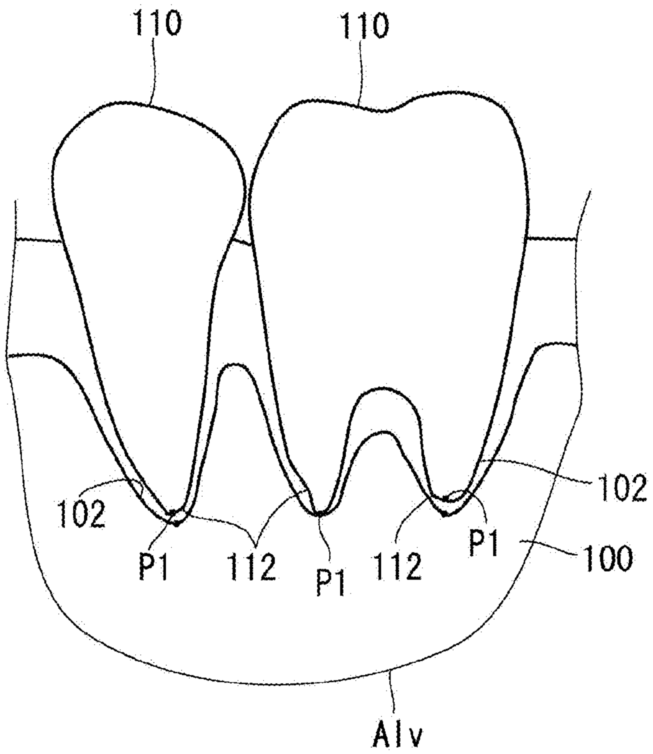
FIG. 13 is a view illustrating a state in which a tooth is buried in an alveolar bone.

FIG. 13 is a longitudinal sectional view illustrating a state in which some teeth 110 of the volume data 54*a* are buried in the alveolar bone 100. As illustrated in FIG. 13, in the volume data 54*a*, the voxel value of the outer surface of the tooth 110 has a higher value than that around the voxel value. For this reason, for example, with respect to the dental arch region Ar of the lower jaw, it may be determined whether each voxel value has the voxel value corresponding to the outer surface of the tooth 110 from the bottom to the top, and it may be determined that the position of the voxel is a position P1 of the tooth root 112 when the voxel having the voxel value corresponding to the outer surface of the tooth 110 is detected.

Furthermore, for example, the tooth root may be specified by three-dimensional pattern recognition or application of the learned model obtained by the machine learning using the volume data in which tooth root positions are distinguished as the learning data.

For example, the continuous section Q1 based on the positions of the plurality of tooth roots 112 may be a section in which a reference line obtained based on the positions of the tooth roots 112 is uniformly continuous in the vertical direction. Such the reference line may be a curve obtained such that a sum of squares of the distances to the tooth root 112 is minimized in the XY-plane where the position of the tooth root 112 is projected, or may be a Pezier curve or a folding line set to pass through the tooth root 112.

The number of tooth roots 112 exceeds 2, and for example, may be 3 or 4. In this case, the position of the center of gravity of the figure formed to be closed by connecting the positions occupied by the apex with a straight line may be set as the position of the tooth root (comprehensive tooth root position). Even when there are two tooth roots 112, the position of the center of gravity may be set as the position of the tooth root.

It is conceivable that the alveolar bone region Alv includes the alveolar bone regions Alv of the upper jaw and the lower jaw. In this case, the continuous section Q1 may be set separately for the upper and lower sides. FIG. 7 illustrates a lower continuous section Q1 that is the section curved along the alveolar bone region Alv of the lower jaw in the alveolar bone region Alv of the lower jaw.

Figure 14:
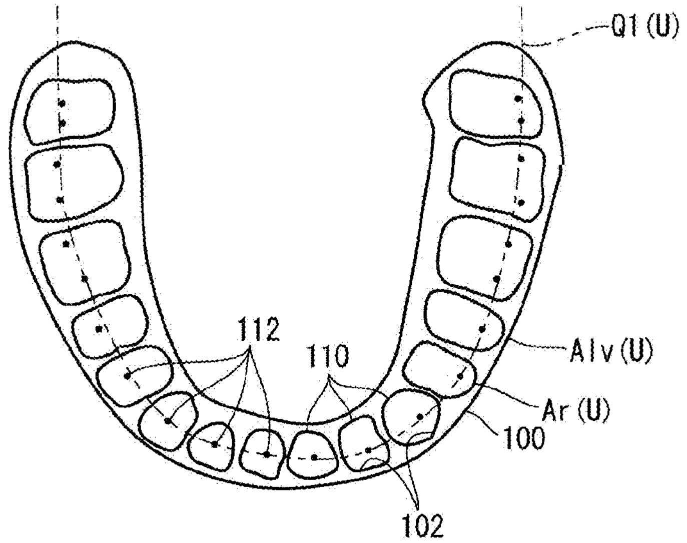
FIG. 14 is a view illustrating an upper continuous section curved along the alveolar bone region of an upper jaw.

FIG. 14 illustrates the upper continuous section Q1 that is the section curved along the alveolar bone region Alv of the upper jaw in the alveolar bone region Alv of the upper jaw. In the following description, an upper alveolar bone region Alv(U) and an upper continuous section Q1(U) may be described in order to distinguish the upper jaw from the lower jaw. Similarly, a lower alveolar bone region and the lower continuous section may be described as ta lower alveolar bone region Alv(D) and a lower continuous section Q1(D).

Also in the upper alveolar bone region Alv(U), similarly to the upper alveolar bone region Alv, the upper continuous section Q1(U) that is the section curved along the upper alveolar bone region Alv(U) can be set by specifying the position of the tooth root 112.

When the continuous sections Q1, S1(U) are separately set along the alveolar bone regions Alv, Alv(U) of the upper jaw and the lower jaw, appropriate continuous sections Q1, S1(U) can be set according to the shapes of the upper and lower alveolar bone regions Alv, Alv(U).

The upper and lower boundaries in the volume data 54*a* may be previously set as a known position in the volume data 54*a*, may be set at the height position separated by a previously set distance from the bottom of a jawbone recognized by pattern recognition or the like, or may be set at the position between the upper and lower dental arches after the processing for recognizing the upper and lower dental arches as described above.

Second Example of Setting Processing for Continuous Section

In the case where the continuous section curved along the alveolar bone region Alv is obtained based on the volume data 54*a*, as a second setting processing example, the surface position of the alveolar bone region Alv may be specified to set the continuous section Q2 according to the distance from the surface position.

Figure 15:
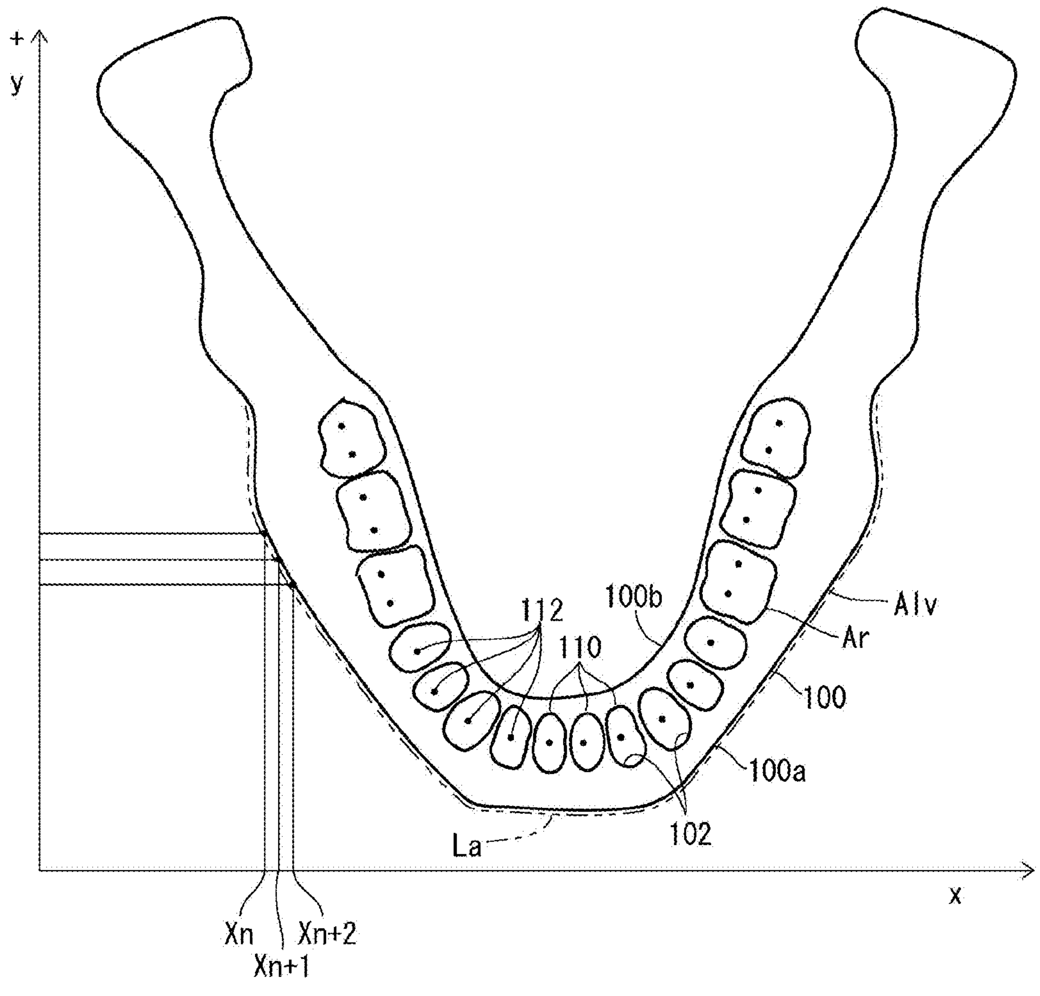
FIG. 15 is an explanatory drawing illustrating a processing example that specifies a surface of the alveolar bone region.

FIG. 15 is an explanatory drawing illustrating a processing example of specifying the surface position of the alveolar bone region Alv. FIG. 15 is a sectional view illustrating the alveolar bone region Alv and the dental arch region Ar along the XY-plane. In FIG. 15, an XY-axis is illustrated.

A horizontal section of the alveolar bone region Alv appears on the XY-plane corresponding to the predetermined height position. In the XY-plane, the front end of the alveolar bone region Alv is set to face downward. A plurality of discretized x-coordinates x(0), x(1), . . . , x(n), x(n+1), x(n+2), . . . are set in the X-axis direction. In any x-coordinate, it is determined whether the voxel values of the voxels arranged in the Y-axis direction exceed a value corresponding to a cortical bone (or are equal to or greater than the value corresponding to the cortical bone). The determination may be sequentially made in the +Y-direction. The x-, y-coordinates of voxels with voxel values above the value corresponding to the cortical bone (or above the value corresponding to the cortical bone) are identified as the position of the surface of the cortical bone, namely, the alveolar bone region Alv. By executing the above processing for each of the plurality of x-coordinates, the position of the surface of the alveolar bone region Alv, here, an outer surface line La is set. The outer surface line La may be obtained by performing edge extraction processing on the voxel value.

Figure 16:
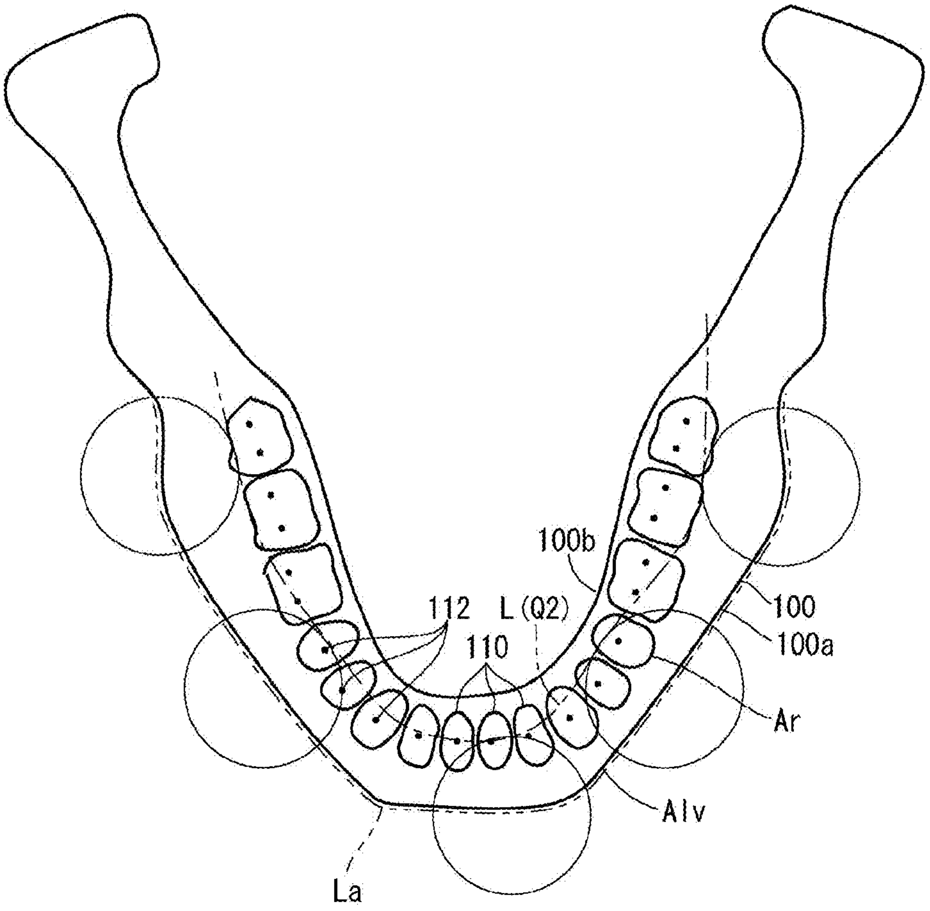
FIG. 16 is a view illustrating a setting example of the continuous section based on the surface of the alveolar bone region.

A continuous line L is set based on the outer surface line La. The continuous line L is a line set to pass through the alveolar bone region Alv based on the outer surface line La. For example, as illustrated in FIG. 16, the line that enters the alveolar bone region Alv at a certain distance from the continuous line L may be set as the continuous line L. The continuous line L may be set as the line passing as close as possible to the tooth root 112.

By repeating the above processing while changing the height in the Z-axis direction, the continuous line L is obtained for each height. A set of the continuous lines L in the Z-direction is obtained as a continuous section Q2 that changes in the Z-axis direction.

Similarly, regarding the upper jaw, the continuous section corresponding to the surface of the alveolar bone region of the upper jaw is obtained.

In the above example, the continuous section is obtained based on a buccal surface of the alveolar bone region Alv. The continuous section may be obtained based on a lingual surface of the alveolar bone region Alv, or the continuous section may be obtained based on both the buccal surface and the lingual surface. For example, the intermediate position between the buccal surface and the lingual surface may be the continuous section.

Modification Example of Continuous Section

A processing example of step S7 will be described more specifically. It is conceivable that the sectional position is changed by, for example, horizontal movement (movement in the horizontal direction) or movement in the buccolingual direction of the continuous section Q1. It is conceivable that the sectional position is changed based on the operation received by the operation receiving interface 56. For example, the operation on the operation receiving interface 56 may be a wheel operation of the mouse 56*a*, a combination of the key operation of the keyboard and the wheel operation of the mouse 56*a*, or a drag operation by the mouse 56*a*.

The image processor C52 changes the transparency degree based on the moved continuous section Q1 and generates the display stereoscopic image. The display apparatus 58 displays the display stereoscopic image.

Figure 17:
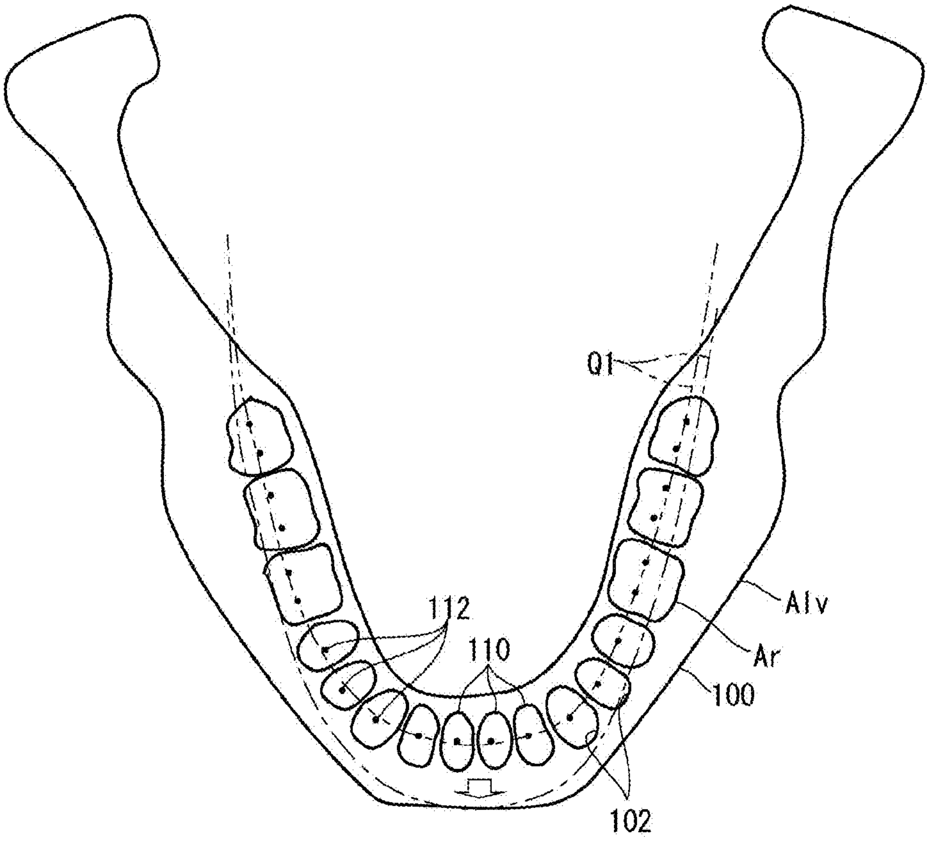
FIG. 17 is a view illustrating an example in which the continuous section is moved in parallel to a front side.

FIG. 17 illustrates an example in which the continuous section Q1 is translated forward. The continuous section Q1 moves in parallel to the front side in its original shape. The transparency degree is changed based on the continuous section Q1 after the translation, and the display stereoscopic image is generated and displayed. The continuous section Q1 may be translated back and forth or may be translated left and right. The translation may be considered as an example of horizontal movement. Because the dental arch has the shape expanding from the anterior tooth region toward the left and right molar regions, it may be generally considered that the translation also includes the element of the movement in the buccolingual direction of the continuous section. Usually, the back and forth translation may be considered to be the movement including the element of the movement from the lingual side to the buccal side in almost the entire region of the dental arch, or the movement including the element of the movement from the buccal side to the lingual side in almost the entire region of the dental arch. Even when a component of the movement in an oblique direction is added to the translation, the movement usually includes the component of the movement in the buccolingual direction of the continuous section as long as the component of the movement in the parallel direction is included. Such the movement including the element of the movement in the buccolingual direction may also be considered to be the movement in the buccolingual direction.

In addition, the continuous section Q1 may be changed by the automatic processing for the image processor C52, the transparency degree is changed with reference to the continuous section Q1 each time of the change is made, the display stereoscopic image may be generated and displayed, and the operator may receive the operation to stop the change at a desired position. In addition, a lesion candidate may be searched by automatic processing for the image processor C52, and the continuous section Q1 may be automatically determined at the position where the lesion candidate exists.

Figure 18:
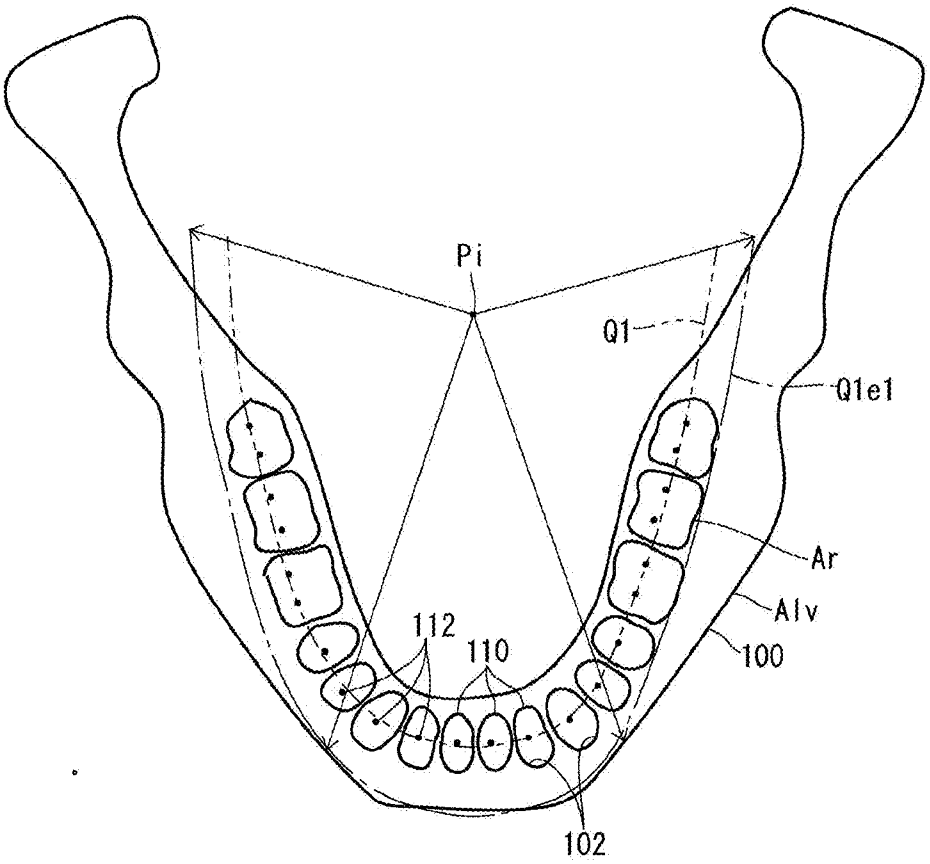
FIG. 18 is a view illustrating an example in which the continuous section moves in a buccolingual direction.
Figure 19:
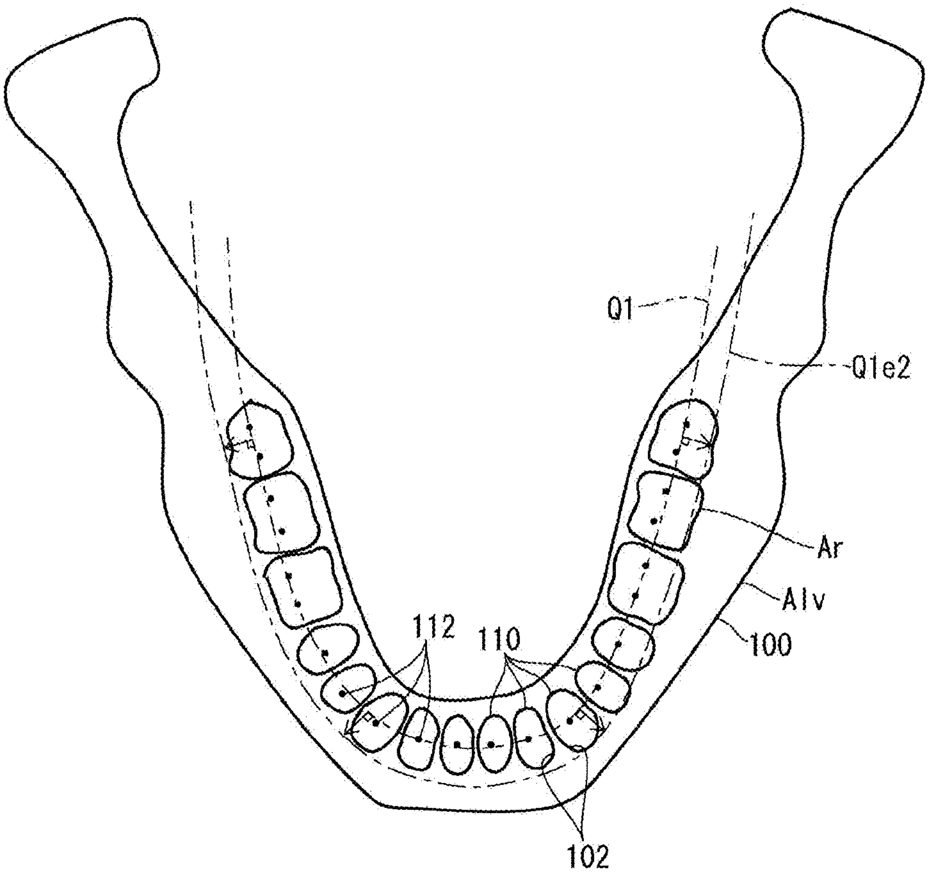
FIG. 19 is a view illustrating another example in which the continuous section moves in the buccolingual direction.

FIGS. 18 and 19 illustrate an example in which the continuous section Q1 is moved in the buccolingual direction. The movement of the continuous section Q1 in the buccolingual direction may be understood as enlargement and reduction of the continuous section Q1. The movement of the continuous section Q1 in the buccal direction is the enlargement of the continuous section Q1 and the movement of the continuous section Q1 in the lingual direction is the reduction of the continuous section Q1.

Figure 20:
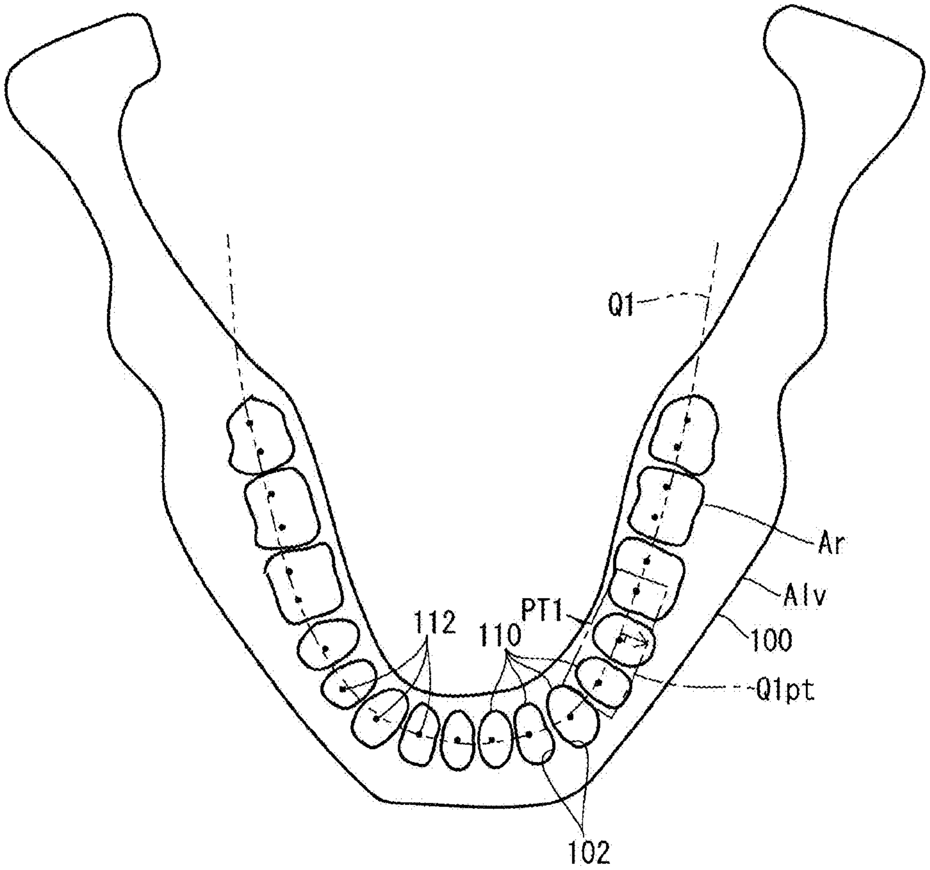
FIG. 20 is a view illustrating an example in which the continuous section is partially moved in the buccolingual direction.

The movement of the continuous section Q1 may be partial. For example, only in a partial region PT1, as illustrated in FIG. 20, a continuous section Q1*pt* may be moved in the buccolingual direction. In the example, it is moving in the buccal direction.

FIG. 18 illustrates an enlarged continuous section Q1*e*1 in which the continuous section Q1 moves in the buccal direction, namely, is enlarged. In the enlarged continuous section Q1*e*1, the continuous section Q1 is similarly enlarged based on a point Pi of the lingual side. The continuous section Q1 may be similarly reduced to a reduced continuous section.

FIG. 19 illustrates an enlarged continuous section Q1*e*2 in which the continuous section Q1 is moved in the buccal direction by another processing, namely, is enlarged. The enlarged continuous section Q1*e*2 is a line passing through a position separated by a certain distance from each point on the continuous section Q1 to the outside orthogonal to a tangential direction. The reduced continuous section may be set to pass through the position separated by a certain distance inward orthogonal to the tangential direction from each point on the continuous section Q1.

The parallel movement and the movement in the buccolingual direction may be combined to set the continuous section. The movement and the scaling operation may be set such that the operation applied to a part of the continuous section Q1 extends over the entire region of the continuous section Q1 in the display target tissue region.

In any case, the translated continuous section Q1 or the enlarged continuous sections Q1*e*1, Q1*e*2 are set as the display continuous section (see step S10), the transparency degree is changed with reference to the changed display continuous section, and the display stereoscopic image is generated and displayed on the display apparatus 58 (see steps S5 and S6).

Examples of movement of continuous section Q1 in buccolingual direction according to geometric rules are the parallel movement of the continuous section Q1 in its original shape as indicated in FIG. 17 and similar enlargement and reduction of continuous section Q1 with respect to point Pi on the tongue side as shown in FIG. 18. The processor C52 can execute movement of the continuous section Q1 in buccolingual direction according to geometric rules when the operation of changing the position of the continuous section Q1 is accepted in step S7.

<Effects and the Like>

According to the image processing apparatus 50 configured as described above, the continuous sections Q1, Q2 curved along the alveolar bone 100 are set in the alveolar bone region Alv, and the display stereoscopic image Im in which the transparency degree of the first region R1 located on one side with the continuous sections Q1, Q2 as the boundaries in the alveolar bone region Alv is larger than the transparency degree of the second region R2 located on the other side with the continuous sections Q1, Q2 as the boundaries in the alveolar bone region Alv is generated. For this reason, the second region R2 appearing in the continuous sections Q1, Q2 curved along the alveolar bone 100 can be easily observed by the display stereoscopic image Im. In the continuous sections Q1, Q2, a large number of teeth 110 are displayed side by side as compared with the case where the section is the plane. Thus, the display stereoscopic image Im suitable for a wider range of the observation along the alveolar bone region Alv is provided based on the volume data 54*a* of the maxillofacial region obtained by the X-ray CT imaging.

When the continuous sections Q1, Q2 are obtained based on the volume data 54*a* obtained by the X-ray CT imaging, the continuous sections Q1, Q2 suitable for observing the alveolar bone 100 corresponding to the skeleton of the head P targeted for the X-ray CT imaging are obtained.

In addition, the lower continuous section Q1 curved along the alveolar bone region Alv of the lower jaw and the upper continuous section Q1(U) curved along the alveolar bone region Alv(U) of the upper jaw are set as the continuous sections Q1, S1(U), so that the display stereoscopic image suitable for the wider range of the observation along the upper and lower separate alveolar bone regions Alv, Alv(U) can be provided.

In the display stereoscopic image Im, in the case where the first region R1 is made invisible, namely, in the case where the first region R1 is transparent, the second region R2 is easily and clearly observed in the continuous section Q1.

In the display stereoscopic image Im, when the transparency degree of the region of the teeth 110 is displayed to be smaller than the transparency degree of the first region R1, the teeth 110 can be easily observed.

In addition, when the continuous section Q1 is set based on the position of the tooth root 112, the state in which the teeth 110 arranged along the dental arch is buried with respect to the alveolar bone region Alv can be easily observed.

In addition, when the continuous section Q2 is set according to the distance from the surface position of the alveolar bone region Alv, the section having a uniform internal depth with reference to the surface of the alveolar bone region Alv is easily observed.

In addition, because the continuous section Q2 is along the surface of the alveolar bone region Alv, the continuous section Q2 is the section that changes in the height direction. For this reason, the section obtained by obliquely cutting the alveolar bone 100 with respect to the X-axis direction and the Y-axis direction appears in the continuous section Q2. For this reason, the internal structure of the alveolar bone 100 can be easily viewed from various directions. The teeth 110 are also easily exposed in various directions, and the teeth 110 can also be easily observed.

In addition, by changing the continuous sections Q1, Q2 based on the operation received by the operation receiving interface 56, the alveolar bone 100 can be observed by various sections.

In addition, because the continuous section Q1 moves in the buccolingual direction, the entire dental arch can be easily observed at various depths from the surface of the alveolar bone 100.

<Modification of Display Color>

An example in which a display color of the display stereoscopic image is modified will be described as a first modification.

That is, the display color of the second region R2 displayed in the continuous section Q1 may be different according to the position in the buccolingual direction.

Figure 21:
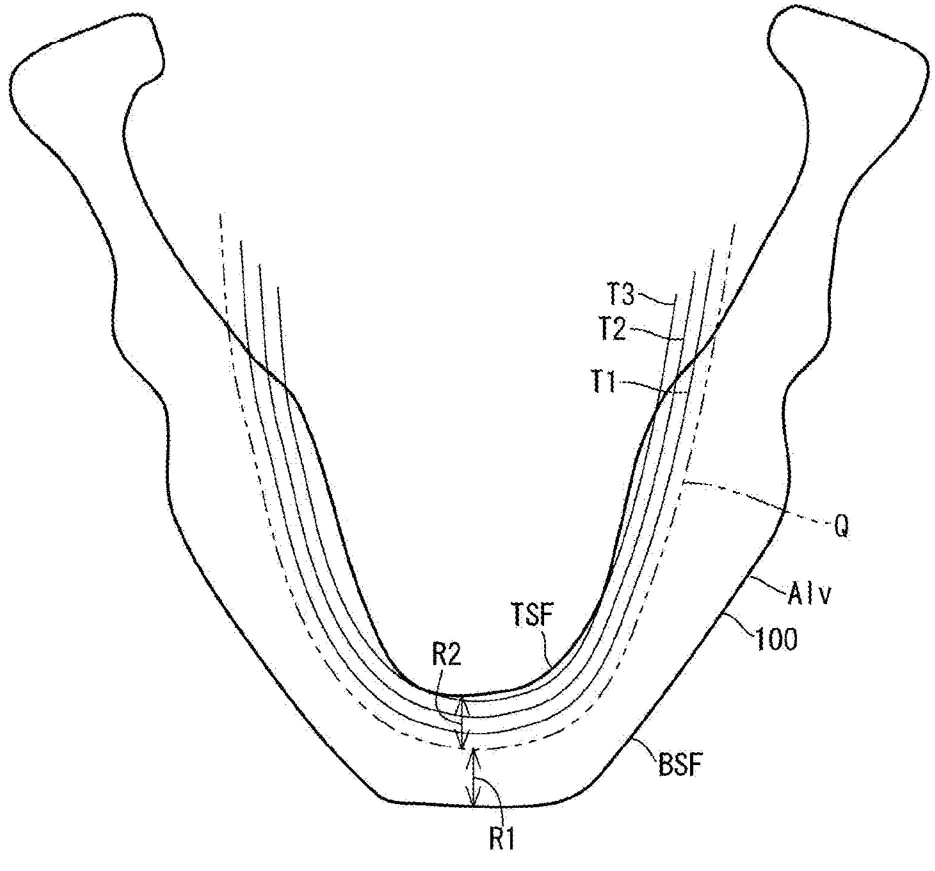
FIG. 21 is an explanatory drawing illustrating a setting example of a display color.

As illustrated in FIG. 21, the continuous section Q1 is set with respect to the alveolar bone 100, the set continuous section Q1 is to be a continuous section at a reference position, and boundary surfaces T1, T2, T3 are set toward the buccal side with respect to the continuous section Q1. The boundary surfaces T1, T2, T3 may be surfaces obtained by reducing the continuous section Q1 to the buccal side. Then, different display colors are set for each region divided by the continuous section Q1 and the boundary surfaces T1, T2, T3 in the second region R2 of the alveolar bone 100. For example, the display color may be set such that the color changes from cool to warm as the distance from the continuous section Q1 increases (for example, toward the buccal side), or the display color may be set such that the color gradually changes from light to dark as the distance from the continuous section Q1 increases (for example, toward the buccal side).

The changing display color can be allocated according to the distance from the continuous section at the reference position, but it is also possible to be allocated according to the distance from buccal surface BSF of the alveolar bone region Alv or the distance from lingual surface TSF of the alveolar bone region Alv. As above, the changing display color can be allocated according to the distance from a surface at the reference position such as the continuous section Q1 at the reference position, the buccal surface BSF or the lingual surface TSF.

The rendering processing is performed on the volume data 54*a* to exhibit the set display color, and a display stereoscopic image Imv is generated and displayed on the image processing apparatus 50.

Figure 22A:
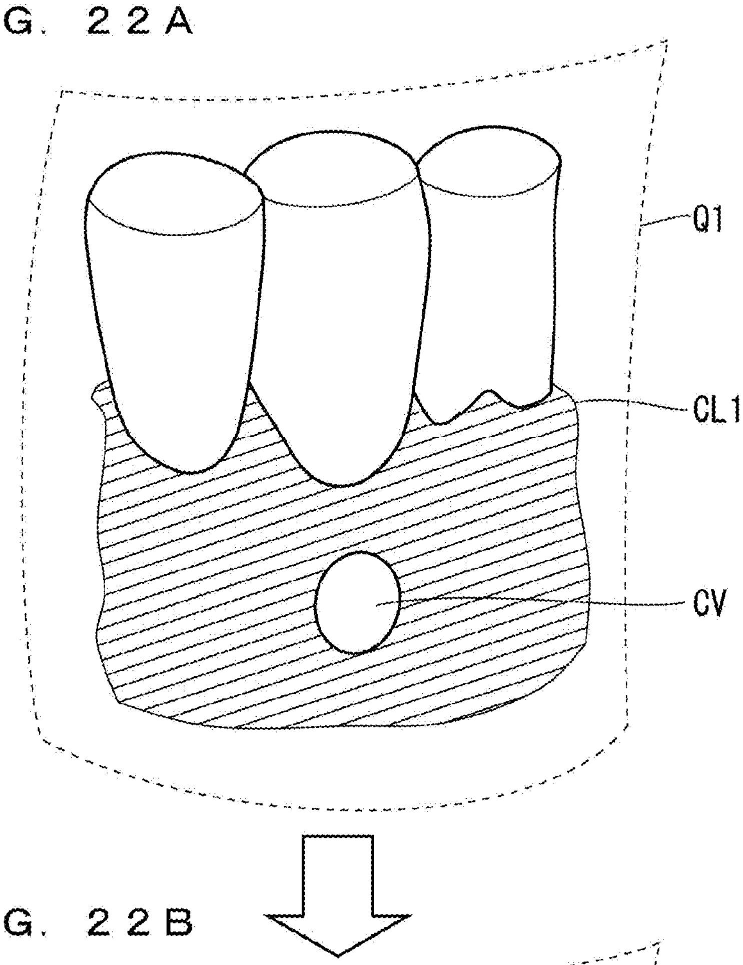
FIGS. 22A and 22B are views illustrating display examples in a case where the display color of a second region is color-coded according to the position in the buccolingual direction.
Figure 22B:
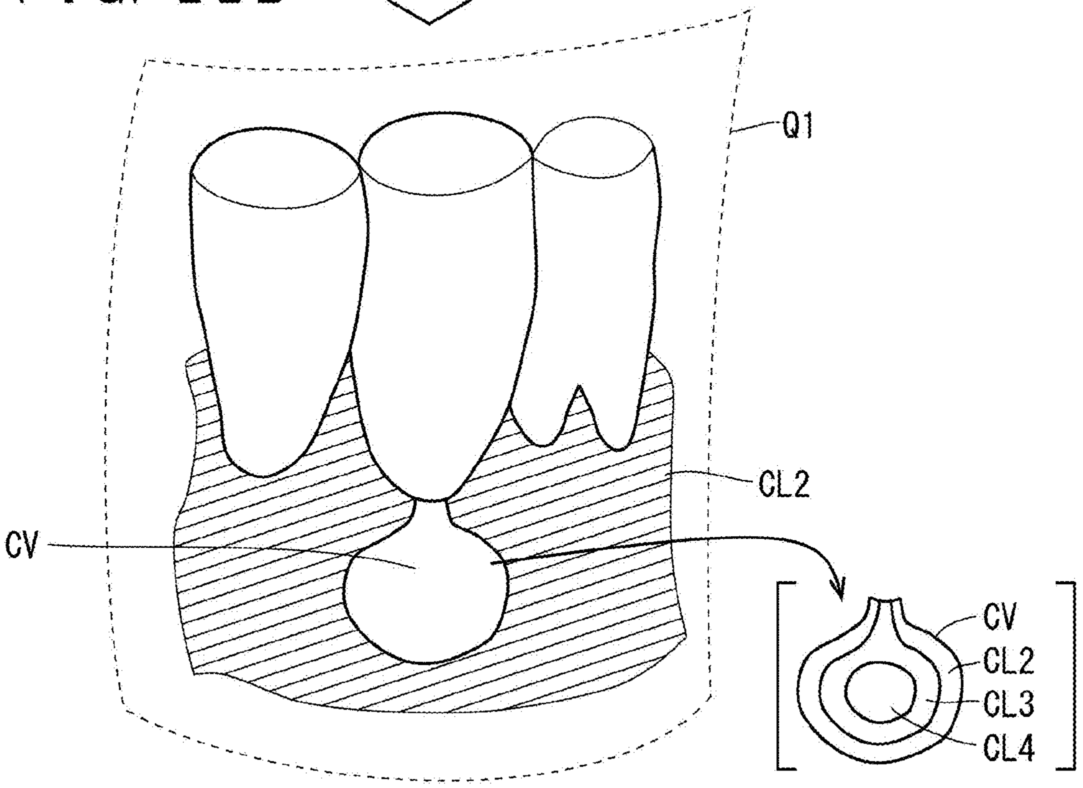

FIGS. 22A and 22B are views illustrating display examples in the case where the display color of the second region R2 is color-coded according to the position in the buccolingual direction. In FIGS. 22A and 22B, the position of the continuous section Q1 in the buccolingual direction is different. FIG. 22A is closer to the buccal side in the buccolingual direction, and FIG. 22B is closer to the lingual side in the buccolingual direction. A cavity CV caused by bone resorption is observed in the alveolar bone region in the example indicated in FIGS. 22A and 22B. The cavity CV in FIG. 22A looks small because the spread of the cavity CV at the depth is narrow but the cavity CV in FIG. 22B looks large because the spread of cavity CV at the depth is wide. In FIG. 22A, the display color of the alveolar bone is color CL1, and in FIG. 22B, the display color of the alveolar bone is color CL2.

Figure 27:
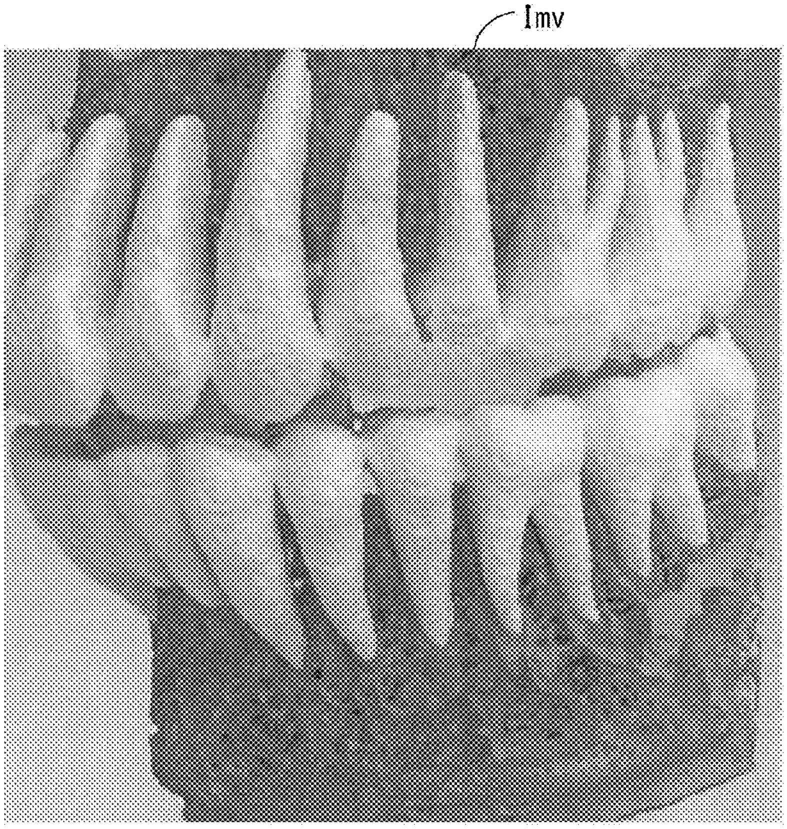
FIG. 27 is a view illustrating another display example of the display stereoscopic image.
Figure 28:
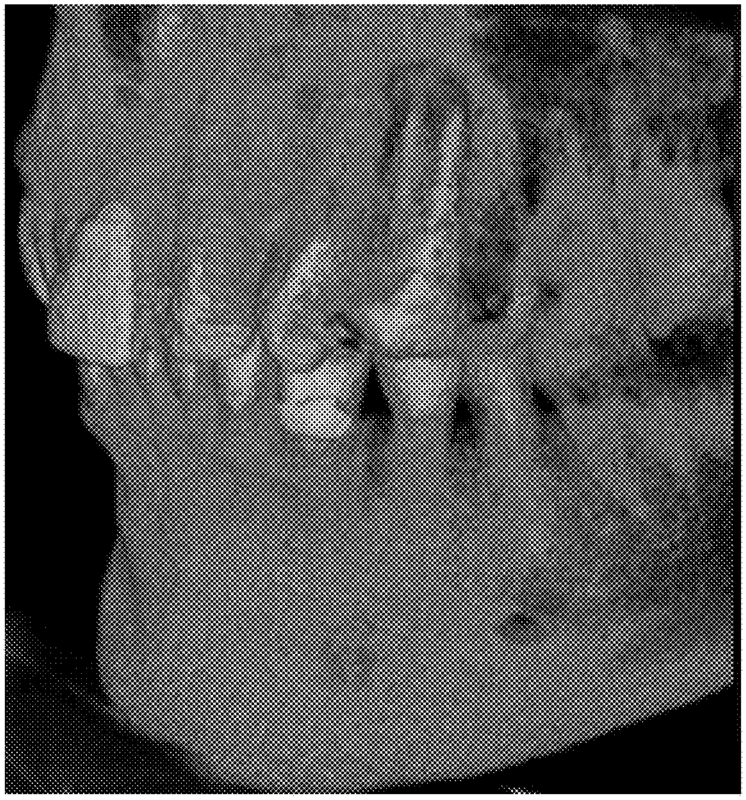
FIG. 28 is a view illustrating an example of the volume rendering image in which the transparency degree of the first region is set to the intermediate value.

Because the inside of the alveolar bone is actually composed of a mesh-like tissue, when the display color of the second region R2 displayed in the continuous section Q1 differs according to the position in the buccolingual direction, the unevenness and the depth of each portion of the second region R2 displayed in the continuous section Q1 can be easily grasped. In addition, the position of each part of the second region R2 in the buccolingual direction can be easily grasped. (See FIG. 27 described below)

The display color may be indicated only at the continuous section Q1 but it is also possible to indicate the allocation of color coding according to the depth to an organ which has depth to be seen. For example, colors CL2, CL3, CL4 are allocated according to the depth of the cavity CV as indicated in square brackets in FIG. 22B.

<Modification of Transparency Degree>

An example of setting the transparency degree is not limited to the above example.

In order to be able to observe the tooth 110 that has passed through the first region R1, the transparency degree of the region of the tooth 110 is smaller than the transparency degree of the first region R1.

For example, the transparency degree of the first region R1 may be the intermediate value (for example, 80%, and hereinafter, the transparency degree of more than 0% and less than 100% is simply referred to as the intermediate value) larger than 0% and smaller than 100%, the transparency degree of the second region R2 may be the intermediate value (for example, 50%) smaller than the transparency degree of the first region R1, and the transparency degree of the region of the tooth 110 may be the intermediate value (for example, 20%) smaller than the transparency degree of the second region R2.

In addition, the transparency degree of the first region R1 may be the intermediate value (for example, 80%), the transparency degree of the second region R2 may be the intermediate value (for example, 20%) smaller than the transparency degree of the first region R1, and the transparency degree of the region of the tooth 110 may be the value (for example, 50%) between the transparency degree of the first region R1 and the transparency degree of the second region R2. When the transparency degree of the region of the tooth 110 is larger than the transparency degree of the second region R2, the tooth 110 is displayed in the state closer to the transparency than the second region R2, so that it is suitable to observe the second region R2 while the outline of the tooth 110 is grasped.

In the case where desirably the tooth 110 is observed well, the transparency degree of the region of the tooth 110 may be smaller than the transparency degree of the second region R2.

For example, the transparency degree of the first region R1 may be the intermediate value (for example, 80%), the transparency degree of the second region R2 may be the intermediate value (for example, 50%) smaller than the transparency degree of the first region R1, and the transparency degree of the region of the tooth 110 may be the value (for example, 20%) smaller than the transparency degree of the second region R2. Because the second region R2 is displayed in the state closer to the transparency than the tooth 110, the tooth 110 is easily observed while the outline of the second region R2 is grasped.

Figure 23:
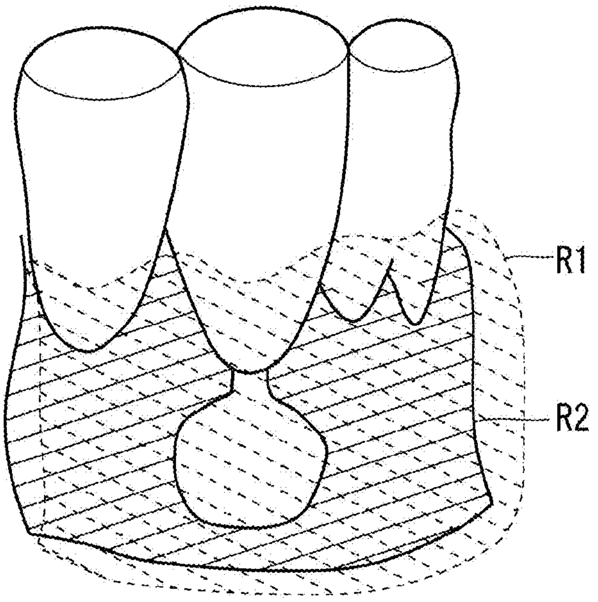
FIG. 23 is a view illustrating a volume rendering image in which a transparency degree of a first region is set to an intermediate value.

In the case where the transparency degree of the first region R1 or the second region R2 is set to the intermediate value, the volume-rendered display stereoscopic image is generated based on the volume data 54*a*. FIG. 23 is a view illustrating a volume rendering image in which the transparency degree of the first region R1 is set to the intermediate value. In this case, the internal structure of the alveolar bone region Alv is easily grasped. When the difference in transparency degree between the first region R1 and the second region R2 is appropriately set, the second region R2 appearing in the continuous section can be easily observed.

<Other Modifications>

In the above one embodiment, the example in which the display stereoscopic image is generated with the buccal side as the viewpoint is illustrated. For example, the viewpoint direction of the display stereoscopic image may be variably adjusted by dragging work of the mouse or the cursor operation. When the display stereoscopic image is generated and displayed with the viewpoint located on the buccal side as a reference, the second region may be located on the buccal side with the continuous sections Q1, Q2 as the boundaries, and the first region may be located on the lingual side.

In the one embodiment, the X-ray imaging apparatus including the image processing apparatus has been described. The image processing apparatus that performs the processing for the display may be an apparatus different from the apparatus that performs the X-ray CT imaging and the apparatus that performs the processing for reconstructing the three-dimensional data from the imaged data. For example, the image processing apparatus may generate the display stereoscopic image by performing the image processing on the image data provided from the outside through communication or a storage medium.

In the display stereoscopic image, the color of the tooth 110 and the color of the second region R2 may be different. The tooth 110 may be achromatic, for example, white, and the second region R2 may be chromatic. The surface of the tooth 110 may be displayed as an achromatic color, for example, white, and the second region R2 may be set to a chromatic color.

Figure 24:
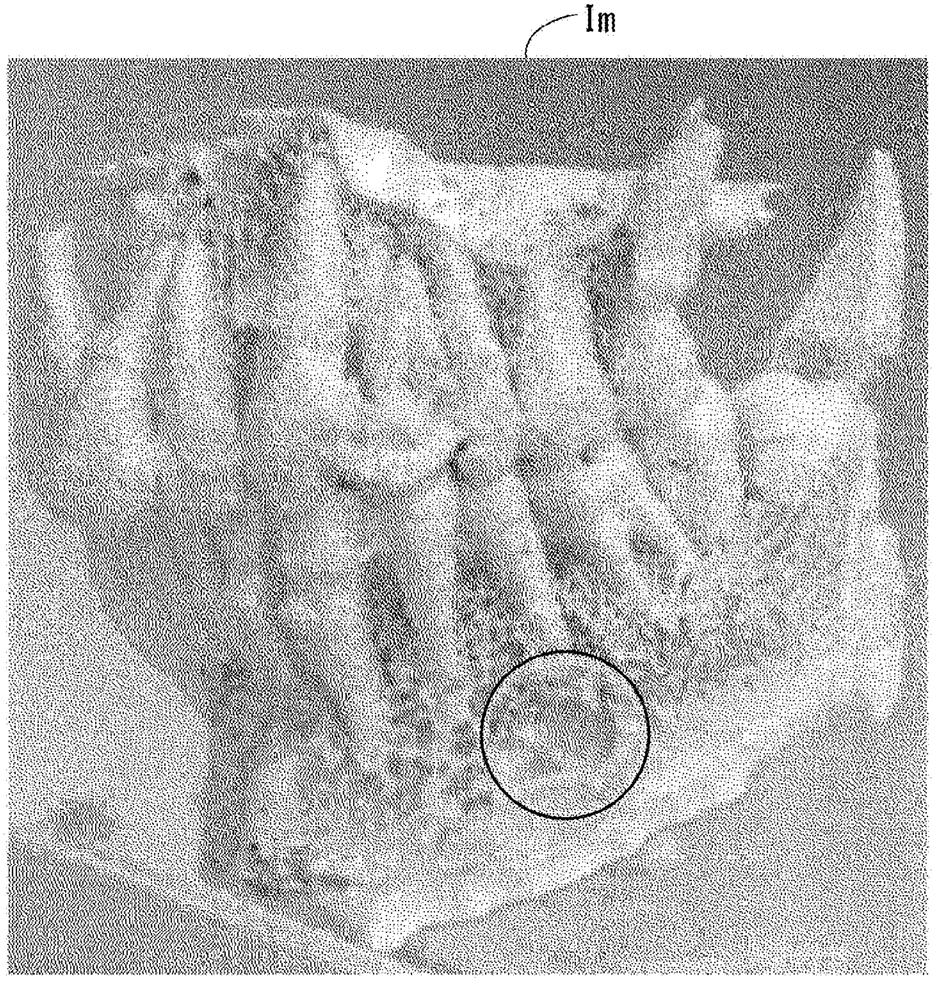
FIG. 24 is a view illustrating a display example of a display stereoscopic image.
Figure 25:
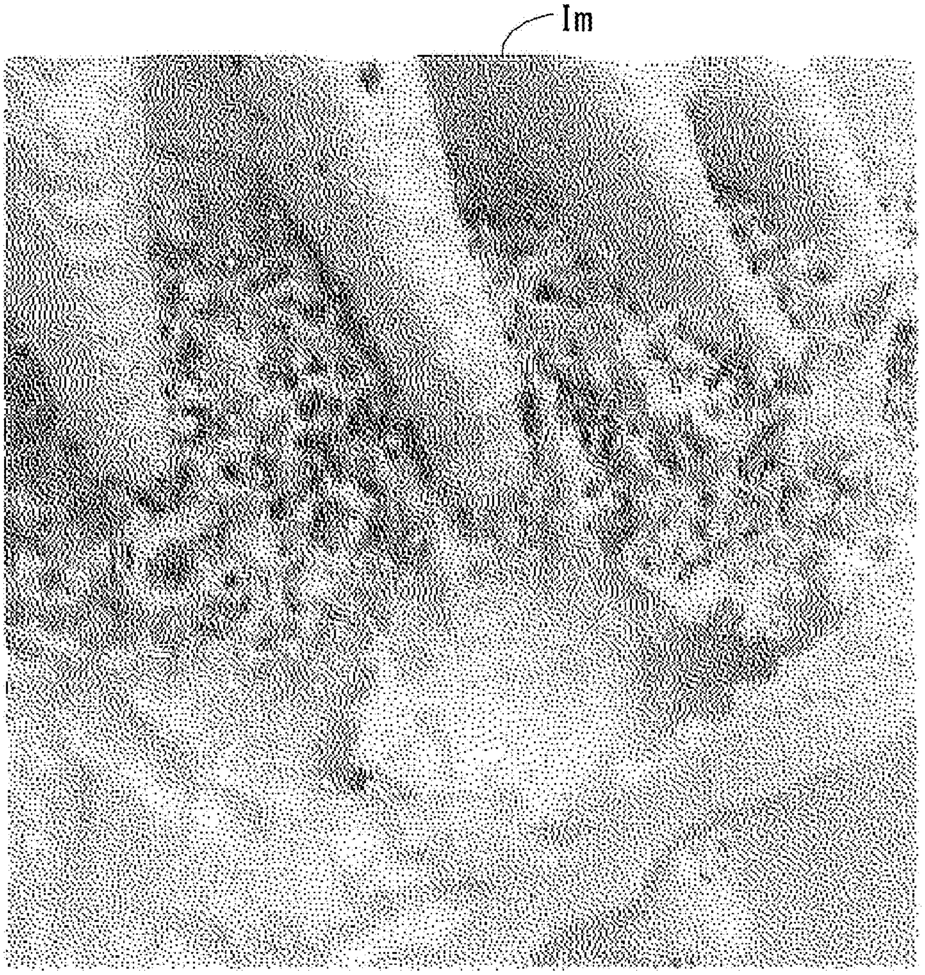
FIG. 25 is an enlarged view of FIG. 24.
Figure 26:
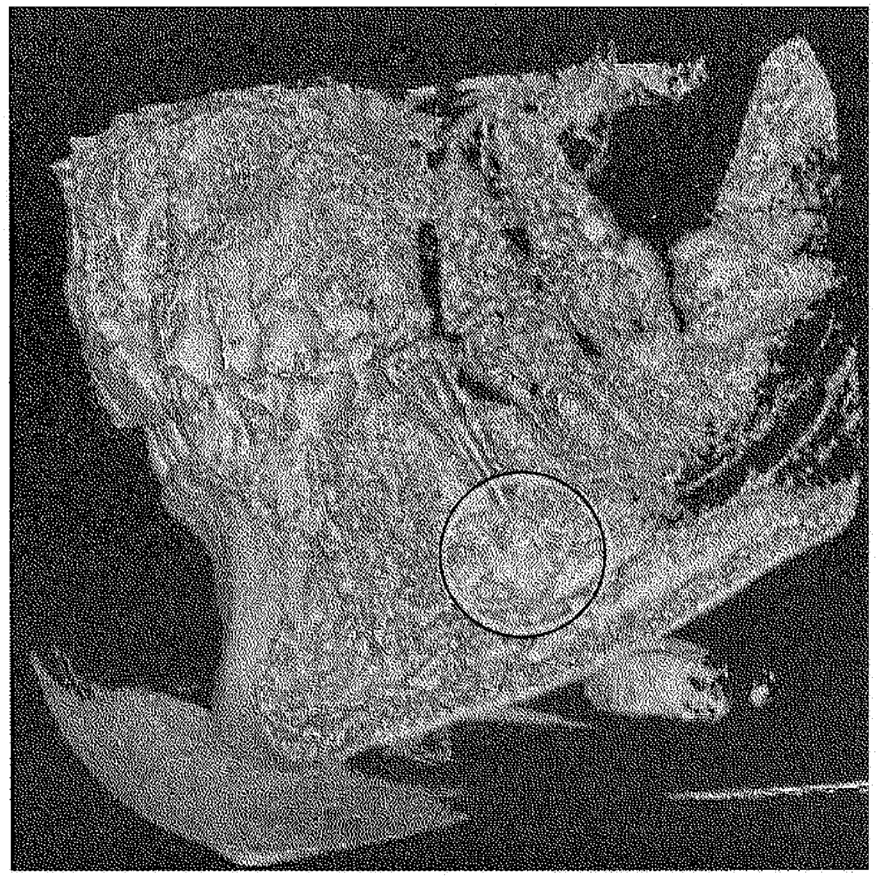
FIG. 26 is a view illustrating a display example according to a comparative example.

FIGS. 10, 11, 12, 22A, 22B, and 23 illustrate FIGS. 24 to 28 that are generated by performing the CT imaging on the actual maxillofacial region and performing the image processing. FIG. 24 corresponds to FIG. 10, FIG. 25 corresponds to FIG. 11, FIG. 26 corresponds to FIG. 12, FIG. 27 corresponds to FIGS. 22A and 22B, and FIG. 28 corresponds to FIG. 23. However, FIGS. 24, 26, 27, and 28 are different from FIGS. 10, 12, 22A, 22B, and 23 in that the processing target is the entire region of the upper and lower jaws.

The configurations described in the above one embodiment and the modifications can appropriately be combined as long as they are not inconsistent with each other.

The present disclosure discloses the following aspects.

A first aspect is an image processing apparatus that processes image data of a maxillofacial region obtained by X-ray CT imaging, the image processing apparatus includes: a memory that stores the image data including an alveolar bone region; and an image processor that generates a display stereoscopic image based on the image data, in which the image processor executes: processing for setting a continuous section curved along the alveolar bone region in the alveolar bone region; and processing, as the display stereoscopic image, for generating an image in which a transparency degree of a first region located in a region on one side with the continuous section in the alveolar bone region as a boundary is displayed to be larger than a transparency degree of a second region located in a region on the other side with the continuous section in the alveolar bone region as a boundary.

According to this image processing apparatus, the continuous section curved along the alveolar bone region is set in the alveolar bone region, and the display stereoscopic image in which the transparency degree of the first region located in the region on one side with the continuous section in the alveolar bone region as the boundary is larger than the transparency degree of the second region located in the region on the other side with the continuous section in the alveolar bone region as the boundary. For this reason, the continuous section curved along the alveolar bone can be easily observed by the display stereoscopic image. Thus, the display stereoscopic image suitable for the wider range of observation along the alveolar bone region is provided based on the image data of the maxillofacial region obtained by the X-ray CT imaging.

A second aspect is the image processing apparatus according to the first aspect, in which the image processor obtains the continuous section curved along the alveolar bone region based on the image data.

Thus, the continuous section suitable for the image data obtained by the X-ray CT imaging is obtained.

A third aspect is the image processing apparatus according to the first or second aspect, in which the alveolar bone region may include the alveolar bone region of an upper jaw and the alveolar bone region of a lower jaw, and the image processor may set, as the continuous section, an upper continuous section that is a section curved along the alveolar bone region of the upper jaw in the alveolar bone region of the upper jaw and a lower continuous section that is a section curved along the alveolar bone region of the lower jaw in the alveolar bone region in the lower jaw.

In this case, the display stereoscopic image suitable for the wider observation along upper and lower separate alveolar bone regions is provided based on the image data of the maxillofacial region obtained by the X-ray CT imaging.

A fourth aspect is the image processing apparatus according to any one of the first to third aspects, in which the image processor may generate an image subjected to volume rendering based on the image data as the display stereoscopic image.

Thus, the internal structure can be easily grasped when the transparency degree is appropriately set.

A fifth aspect is the image processing apparatus according to any one of the first to fourth aspects, in which the display stereoscopic image may be an image in which the first region is made invisible.

As described above, when the first region is made invisible in the display stereoscopic image, the second region is easily and clearly observed in the continuous section.

A sixth aspect is the image processing apparatus according to any one of the first to fifth aspects, in which the image data may include a dental arch region in which a plurality of teeth are arranged in an arch shape, and the image processor may identify regions of the plurality of teeth, and may generate, as the display stereoscopic image, an image in which the transparency degree of the tooth region is displayed to be smaller than the transparency degree of the first region.

In this case, the tooth is easily observed because the transparency degree of the tooth is small.

A seventh aspect is the image processing apparatus according to any one of the first to sixth aspects, in which the image data may include a dental arch region in which a plurality of teeth are arranged in an arch shape, and the image processor may identify a tooth root position of the dental arch region, and may set the continuous section with reference to the tooth root position.

Thus, the state in which the teeth arranged along the dental arch are buried in the alveolar bone region can be easily observed.

An eighth aspect is the image processing apparatus according to any one of the first to seventh aspects, in which the image processor may identify a surface position of the alveolar bone region, and may set the continuous section according to a distance from a surface position of the alveolar bone region.

Thus, the continuous section according to the distance from the surface of the alveolar bone region can be easily observed.

A ninth aspect is the image processing apparatus according to any one of the first to eighth aspects, further including an operation receiving interface that receives operation of an operator, in which the image processor may change the continuous section based on the operation received by the operation receiving interface.

Thus, the continuous section is changed by the operation on the operation receiving interface.

A tenth aspect is the image processing apparatus according to the ninth aspect, in which the image processor may move the continuous section in a buccolingual direction based on the operation received by the operation receiving interface.

When the continuous section moves in the buccolingual direction, the entire dental arch can be easily observed at various depths with respect to the surface of the alveolar bone region Alv.

An eleventh aspect is the image processing apparatus according to any one of the first to tenth aspects, in which the image processor may generate, as the display stereoscopic image, an image in which a display color of the second region displayed in the continuous section varies according to a position in a buccolingual direction.

Thus, the position of each part of the second display region displayed in the continuous section is easily grasped in the buccolingual direction.

A twelfth aspect is the image processing apparatus according to any one of the first to eleventh aspects, the continuous section may be configured by a surface having a spread in a vertical direction of a head of a subject and a bending direction along a horseshoe shape of a dental arch, and the alveolar bone region may be set to be divided into a buccal region and a lingual region.

Thus, the upper and lower teeth are easily observed along the dental arch.

An image processing program according to a thirteenth aspect is an image processing program for causing a computer that performs processing for image data of a maxillofacial region obtained by X-ray CT imaging to execute: processing for setting a continuous section curved along an alveolar bone region in the alveolar bone region included in the image data; and processing for generating a display stereoscopic image in which a transparency degree of a first region located in a region on one side with the continuous section in the alveolar bone region as a boundary is displayed to be larger than a transparency degree of a second region located in a region on the other side with the continuous section in the alveolar bone region as a boundary.

According to this image processing program, the continuous section curved along the alveolar bone is set in the alveolar bone region, and the display stereoscopic image in which the transparency degree of the first region located in the region on one side with the continuous section in the alveolar bone region as the boundary is larger than the transparency degree of the second region located in the region on the other side with the continuous section in the alveolar bone region as the boundary. For this reason, the continuous section curved along the alveolar bone can be easily observed by the display stereoscopic image. Thus, the display stereoscopic image suitable for the wider range of observation along the alveolar bone region is provided based on the image data of the maxillofacial region obtained by the X-ray CT imaging.

A fourteenth aspect is the image processing apparatus according to the sixth aspect, in which the continuous section can be moved in the horizontal direction or the buccolingual direction, and the image processor executes processing for changing transparency degree with the moved continuous section as a reference and generating a display stereoscopic image, as the display stereoscopic image.

A fifteenth aspect is the image processing apparatus according to the fourteenth aspect, in which the display stereoscopic image in which the tooth region is the non-sectional display image is generated.

A sixteenth aspect is the image processing apparatus according to the fifteenth aspect, in which the display stereoscopic image in which the transparency degree of the tooth region set to 0% is generated.

A seventeenth aspect is the image processing apparatus according to the sixteenth aspect, in which the display stereoscopic image in which the transparency degree of the first region is set to 100% is generated.

An eighteenth aspect is the image processing apparatus according to the seventeenth aspect, in which the display stereoscopic image in which the transparency degree of the second region is set to 0% is generated.

While the invention has been shown and described in detail, the foregoing description is in all aspects illustrative and not restrictive. It is therefore understood that numerous modifications and variations can be devised without departing from the scope of the invention.

What is claimed is:

1. An image processing apparatus that processes image data of a maxillofacial region obtained by X-ray CT imaging, the image processing apparatus comprising:

a memory configured to store said image data including an alveolar bone region corresponding to an alveolar bone; and circuitry configured to generate a display stereoscopic image based on said image data, wherein said circuitry is further configured to:

set a continuous section curved along said alveolar bone in said alveolar bone region; and generate said display stereoscopic image, the display stereoscopic image having a transparency degree of a first region, located on a first side with said continuous section as a boundary in said alveolar bone region, the transparency degree of the first region being displayed to be larger than a transparency degree of a second region located on a second side with said continuous section as the boundary in said alveolar bone region.

2. The image processing apparatus according to claim 1, wherein said circuitry is further configured to obtain said continuous section curved along said alveolar bone based on said image data.

3. The image processing apparatus according to claim 1, wherein said alveolar bone region includes the alveolar bone of an upper jaw and the alveolar bone of a lower jaw, and said circuitry is further configured to set, as said continuous section, an upper continuous section that is a section curved along the alveolar bone of said upper jaw in an upper jaw alveolar bone region and a lower continuous section that is a section curved along the alveolar bone of said lower jaw in a lower jaw alveolar bone region.

4. The image processing apparatus according to claim 1, wherein said circuitry is further configured to generate an image subjected to volume rendering based on said image data as said display stereoscopic image.

5. The image processing apparatus according to claim 1, wherein said display stereoscopic image is an image in which said first region is made invisible.

6. The image processing apparatus according to claim 1, wherein said image data includes a dental arch region in which a plurality of teeth are arranged in an arch shape, and said circuitry is further configured to:

identify regions of said plurality of teeth; and generate, as said display stereoscopic image, an image in which the transparency degree of the dental arch region is displayed to be smaller than the transparency degree of said first region.

7. The image processing apparatus according to claim 1, wherein said image data includes a dental arch region in which a plurality of teeth are arranged in an arch shape, and said circuitry is further configured to:

identify a tooth root position of said dental arch region; and set said continuous section with reference to said tooth root position.

8. The image processing apparatus according to claim 1, wherein said circuitry is further configured to:

identify a surface position of said alveolar bone region; and set said continuous section according to a distance from the surface position of said alveolar bone region.

9. The image processing apparatus according to claim 1, wherein the circuitry is further configured to receive instruction from an operation receiving interface that receives operation of an operator, wherein said circuitry is further configured to change said continuous section based on the operation received by said operation receiving interface.

10. The image processing apparatus according to claim 9, wherein said circuitry is further configured to automatically generate said display stereoscopic image according to said changed continuous section.

11. The image processing apparatus according to claim 10, wherein said circuitry is further configured to move said continuous section in a buccolingual direction based on the operation received by said operation receiving interface.

12. The image processing apparatus according to claim 1, wherein said circuitry is further configured to generate, as said display stereoscopic image, an image in which a display color of said second region displayed in said continuous section varies according to a position in a buccolingual direction.

13. The image processing apparatus according to claim 1, wherein said continuous section is configured by a surface having a spread in a vertical direction of a head of a subject and a bending direction along a horseshoe shape of a dental arch, and said alveolar bone region is set to be divided into a buccal region and a lingual region.

14. The image processing apparatus according to claim 1, wherein said image data is three-dimensional volume data, and said circuitry is further configured to:

set, as the first region, the first side with said continuous section in said volume data as a boundary, and set, as the second region, the second side with said continuous section in said volume data as a boundary;

set a first transparency degree to that of said first region, set a second transparency degree to that of said second region; and automatically generate said display stereoscopic image by performing rendering processing based on said volume data in which the first transparency degree is set to that of said first region while the second transparency degree is set to that of said second region.

15. The image processing apparatus according to claim 14, wherein each of said first region and said second region includes a plurality of voxels arranged three-dimensionally, and said circuitry is further configured to set the first transparency degree to that of each of said plurality of voxels in said first region, and set the second transparency degree to that of each of said plurality of voxels in said second region.

16. A non-transitory computer readable storage medium that stores an image processing program that when executed by a computer causes the computer to perform a method for processing image data of a maxillofacial region obtained by X-ray CT imaging, comprising:

setting a continuous section curved along an alveolar bone in an alveolar bone region included in said image data; and generating a display stereoscopic image having a transparency degree of a first region, located on a first side with said continuous section as a boundary in said alveolar bone region, the transparency degree of the first region being displayed to be larger than a transparency degree of a second region located on a second side with said continuous section as the boundary in said alveolar bone region.

17. A display stereoscopic image producing method for processing image data of a maxillofacial region obtained by X-ray CT imaging, comprising:

setting a continuous section curved along an alveolar bone in an alveolar bone region included in said image data; and generating a display stereoscopic image having a transparency degree of a first region, located on a first side with said continuous section as a boundary in said alveolar bone region, the transparency degree of the first region being displayed to be larger than a transparency degree of a second region located on a second side with said continuous section as the boundary in said alveolar bone region.

18. The non-transitory computer readable storage medium according to claim 16, wherein the method further comprises obtaining said continuous section curved along said alveolar bone based on said image data.

19. The display stereoscopic image producing method according to claim 17, further comprising obtaining said continuous section curved along said alveolar bone based on said image data.

* * * * *